United States Patent
Rossi et al.

(10) Patent No.: US 6,226,595 B1
(45) Date of Patent: May 1, 2001

(54) METHOD AND APPARATUS USING MULTI-TARGET TRACKING TO ANALYZE BOREHOLE IMAGES AND PRODUCE SETS OF TRACKS AND DIP DATA

(75) Inventors: David J. Rossi, Neuilly sur, Seine (FR); Alan S. Willsky, Bedford, MA (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/253,609

(22) Filed: Feb. 19, 1999

Related U.S. Application Data

(60) Provisional application No. 60/078,170, filed on Mar. 16, 1998.

(51) Int. Cl.$^7$ ........................................... G01V 3/18
(52) U.S. Cl. ................................... 702/10; 702/7
(58) Field of Search .................... 702/10, 11, 12, 702/13; 324/338, 339

(56) References Cited

U.S. PATENT DOCUMENTS

| | | |
|---|---|---|
| 4,357,660 | 11/1982 | Hepp . |
| 5,162,994 | 11/1992 | Torres . |
| 5,299,128 | 3/1994 | Jean-Noel et al. . |

FOREIGN PATENT DOCUMENTS

| | | |
|---|---|---|
| 0 680 000 | 11/1995 | (EP) . |
| 2 772 486 | 6/1999 | (FR) . |
| WO 97 45757 | 12/1997 | (WO) . |

OTHER PUBLICATIONS

Kurien T.; Editor Bar–Shalon: "issues in the design of practical multitarget tracking algorithms, chapter 3 of multitarget–multisensor tracking: advanced applications", 1990 Artech House, Norwood, MA.

*Primary Examiner*—Donald E. McElheny, Jr.
(74) *Attorney, Agent, or Firm*—John H Bouchard

(57) ABSTRACT

A Tracking Dip Estimator software including a novel Multi-Sine Tracking Software is adapted to be stored in a computer system memory for instructing a processor to produce a "first output" including a plurality of tracks in response to input borehole image data, and a "second output" including a plurality of "dip data" d in response to the plurality of tracks, the Tracking Dip Estimator software generating the "first output" and "second output" by:

(1) pre-processing the input borehole image data with a Detector to output a plurality of image edge elements called "reports", (2) using the reports as input to a Multi-Sine Tracking software that recursively develops a "first output" including a plurality of tracks, or a plurality of connected sets of track points, lying along sinusoidal dip events in the input borehole image data; the Multi-Sine Tracking software has embedded mathematical models for sinusoidal dip events, (3) using the "first output" plurality of tracks as input to a Best Fit software that determines a set of pure sine curves that best fit the respective plurality of connected sets of track points, and develops a "second output" including a plurality of "dip data d corresponding to the plurality of "first output" tracks.

11 Claims, 12 Drawing Sheets

FIG.13c
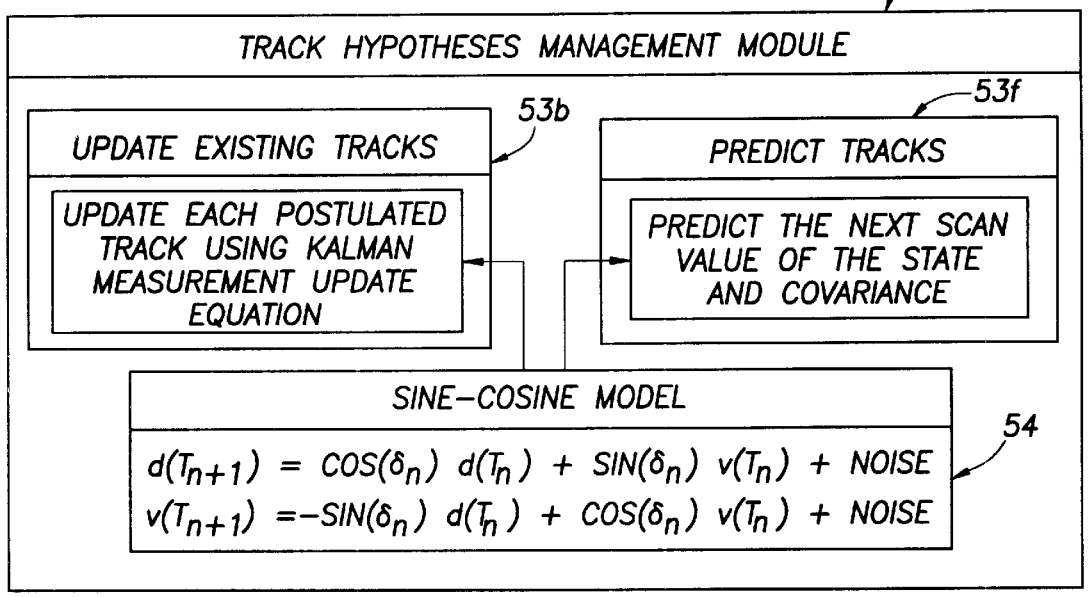
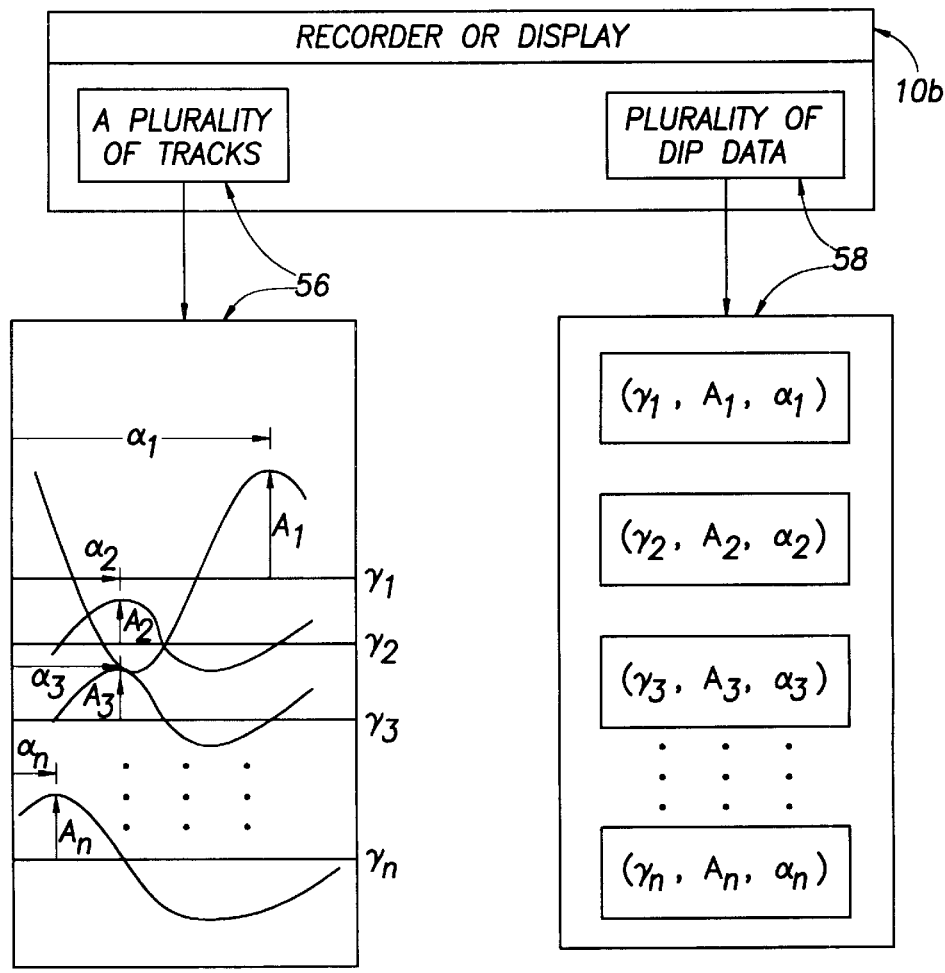
FIG.15

METHOD AND APPARATUS USING MULTI-TARGET TRACKING TO ANALYZE BOREHOLE IMAGES AND PRODUCE SETS OF TRACKS AND DIP DATA

CROSS REFERENCE TO RELATED APPLICATIONS

This is a utility application of prior provisional application Ser. No. 60/078,170 filed Mar. 16, 1998 and entitled "Use of Multi-target Tracking Algorithms for Borehole Image Analysis and Definition of Reservoir Layers".

BACKGROUND OF THE INVENTION

Borehole imaging tools provide different types of borehole images, for example, electrical tools like the Formation MicroImager (FMI) tool, Resistivity At Bit (RAB) and Azimuthal Laterolog (AzLL) deliver electrical images of the borehole wall, and acoustical tools like the Ultrasonic Imaging Tool (USIT) deliver acoustic images of the borehole wall. Electrical and acoustic borehole images show variations on the borehole wall caused, for example, by geological bed boundaries and fractures. One objective of borehole image processing is to geometrically characterize bed boundaries and fractures. When bed boundaries and fractures are inclined or "dipping" at some angle relative to the axis of the borehole, they sweep out a sinusoidal pattern azimuthally around the borehole image. Each bed boundary or fracture is a "dip event" in the borehole image.

The subject matter of the present invention relates to a workstation and software based method and apparatus for analyzing input data representing images of an internal wall of a borehole, containing a plurality of "dip events" and producing a first plurality of output data comprising a first plurality of "tracks", each of which is a set of connected track points lying along a dip event, the first plurality of tracks representing the respective first plurality of dip events inherent in the input data, and a second plurality of output data comprising a plurality of "dip data" d which are the parameters for a dip event that best fits each first plurality of "tracks" representing the first plurality of "dip events", the software-based method and apparatus of this invention utilizing a "Multi-Sine Tracking" (MST) algorithm derived by modifying a Multi-Target Tracking (MTT) algorithm.

There is a software application, known as "BorView", which receives borehole image data from a downhole borehole imaging tool and which allows an operator sitting at a workstation to manually define, by using a mouse in conjunction with the workstation display, a plurality of "dip events" which are inherent in the borehole image data being displayed on the workstation display. Hereafter, a "dip event" is defined as a formation fracture or a bed boundary or any other type of approximately sinusoidally varying feature which appears in an image of the internal wall of a borehole penetrating an earth formation. In fact, the workstation operator previously had to manually define each such "dip event". However, since there are a multitude of such dip events in the borehole image data, the aforementioned manual operation being performed by the operator is very tedious and can be very time consuming. Consequently, a method and apparatus is needed for automatically defining and generating, as an output, a geometrical characterization and a set of dip data corresponding to all, or nearly all, such dip events in the borehole image data in response to the touch of a key on the workstation keyboard.

In the domain of oilfield data interpretation, there is a problem called "dip estimation" of fitting sine curves to dip events in borehole images. In this specification, an algorithm and associated method known as "Multi-Target Tracking" (MTT) is adapted from outside the oilfield domain. It has the potential to be an extremely efficient means for processing borehole image data in the dip estimation problem mentioned above and disclosed in this specification.

MTT algorithms have been developed, mainly for military applications, over the past 20 years [see the "Bar-Shalom" and "Kurien" references which are cited along with other references in the "reference" section located at the end of this specification]. MTT algorithms combine many different, intermittent sources of information into a self-consistent and complete representation of military and civilian vehicle (e.g. aircraft) identity and location in a space such as a heavily traveled airspace. In military defense applications, MTT algorithms quickly integrate large amounts of data from a diverse set of sensor types (e.g. radar, infrared, imaging sensors, human reports, etc). As described therein, MTT algorithms integrate all available data (prior information, sensor data), with the aid of "models", to form many "hypotheses" about what and where each aircraft or other vehicle is, and how it relates to each data item. One component of MTT, and in particular, the Track Hypotheses Management algorithm, ranks competing hypotheses and ultimately determines which one best represents the data in a manner consistent with the models.

The novelty of the method and associated apparatus disclosed in this specification in accordance with the present invention lies in the recognition that fundamental mathematical similarities exist between the MTT problem and the oilfield dip estimation problem addressed in this specification. The principle challenge of the novel method in accordance with the present invention is to reflect the constraints and characteristics of the oilfield dip estimation problem into the mathematical framework that underlies the MTT algorithm.

The present-day use of the MTT algorithm for military and civilian vehicle surveillance and tracking is reported in the public literature [refer to the "Bar-Shalom" and "Kurien" references in the reference section of this specification]. Although the approach is general, and applies for many different types of sensors and target vehicle types, consider a representative problem of processing radar measurements to track one or more aircraft. As defined in the Kurien reference, the input data consist of a set of "scans". At each time, a scan is a set of measurements generated by the sensor (e.g. a radar scan) from a single look over the entire surveillance volume. Typically, the raw scan measurement data are processed by some type of radar detection pre-processor to create a set of "returns" or "reports" at each time. In the Kurien reference, a "report" is defined to be a set of measurements originating from a single source in a single scan. The output of the detection pre-processor is thus a set of reports, that are the input to the next stage of processing called the Multi-Target Tracking (MTT) algorithm. The functional blocks of the MTT algorithm are shown in FIG. 3.5 of Kurien, reproduced as FIG. 13a of this specification (Kurien assigns the name "Multi-Tracker" to his particular implementation). As shown in FIG. 13a, the MTT algorithm is a global approach to process the input sequence of radar reports from multiple targets, output from the pre-processing Detector to form an output of a set of confirmed tracks, one track per aircraft in the scanned space.

During the MTT processing, a large number of potential "hypotheses" must be considered regarding which of the many input reports is associated with which of the multiple targets being tracked. The algorithmic logic to manage these multiple hypotheses is included in the functional module in FIG. 13a labeled "Track Hypotheses Management". The "Track Hypotheses Management" module itself consists of a collection of functional modules, which are shown in more detail in FIG. 3.6 of Kurien, reproduced as FIG. 13b of this specification. Two of the functional modules within the "Track Hypotheses Management" function shown in FIG. 13b are the "Predict Tracks" and "Update Existing Tracks" modules. These two modules have embedded within them a mathematical physical model describing the way aircraft move and accelerate in space, each model being called a "dynamics model". A representative dynamics model for an aircraft is shown in equation 3.1 of Kurien, rewritten in simpler form here:

$$X_t(k+1) = \Theta X_t(k) + v_t(k) \quad (A)$$

where $$X_t = \begin{bmatrix} x_t \\ y_t \\ \dot{x}_t \\ \dot{y}_t \end{bmatrix}$$

and $$\Theta = \begin{bmatrix} 1 & 0 & \Delta T & 0 \\ 0 & 1 & 0 & \Delta T \\ 0 & 0 & 1 & 0 \\ 0 & 0 & 0 & 1 \end{bmatrix}$$

In these equations, each target is tracked in a Cartesian frame with the origin located at the sensor position. The target "state" $X_t$ is represented with four variables constituting the position (x, y) and velocity ($\dot{x}$, $\dot{y}$) of the target in a two-dimensional frame. The variable k represents the discrete time index; $\Delta T$ represents the time interval between the discrete time indices k and (k+1); $v_t$ (k) represents a white random Gaussian (noise) process with zero mean; and t represents the target for which the model is applicable (for example, cargo transport planes and fighter jets have different models to represent their differing acceleration capabilites).

In equation (A), it is seen that (1) each component of the target position (x, y) at time (k+1) is equal to that component of the target position at the previous time k plus the incremental change in position obtained by multiplying the corresponding component of target velocity ($\dot{x}$, $\dot{y}$) at the previous time k times the elapsed time $\Delta T$ plus added noise, and (2) each component of the target velocity ($\dot{x}$, $\dot{y}$) at time (k+1) equal to the corresponding component of the target velocity at the previous time k plus added noise. The vector noise term $v_t$ (k) reflects unpredictable perturbations in the aircraft position and velocity as well as any unmodeled phenomena.

In Borehole Imaging, an electrical or acoustic borehole imaging tool, such as the electrical "Formation Microlmager (FMI)" borehole imaging tool illustrated in FIG. 8, creates a high-resolution "image" of the internal borehole wall. In FIG. 8, the FMI tool creates this high resolution "image" by using an array of small, pad-mounted electrodes [refer to the "Ekstrom" reference in the reference section of this specification]. As the borehole imaging tool is pulled along the axis of the borehole, each pad-mounted electrode acquires a "scan" of data as a function of depth in the borehole. Different electrodes are positioned at different azimuthal positions around the borehole, and the ensemble of scans at many azimuths around the borehole comprises the data to form a borehole "image". As noted in FIG. 11, that image reveals a cylindrical borehole wall that is shown to be unwrapped to span 0 to 360 degrees around the borehole. In FIG. 11, the resolution of the image generated by the FMI tool is on the order of 0.1", revealing fine-scale heterogeneities in the formation.

In FIG. 1, the prominent sinusoidally sweeping features on that "image" correspond to borehole wall "dip events" that are inclined or dipping relative to the borehole axis. One of the most common activities performed when processing borehole images is "dip estimation", which is geometrical characterization of such sinusoidally sweeping features. Identifying the "dip parameters" or sinusoid parameters of the "dip events" corresponds to evaluating the angular inclination and orientation of dipping formation features such as beds and fractures. At a fine scale (centimeters), dip event "fractures" may be recognized in borehole images (see FIG. 11). It should be noted that fractures often cross bed boundaries, and can be highly nonplanar and thus do not correspond precisely to sinusoids in the borehole images; as a result, sophisticated techniques as presented in the subject of this invention are needed for their analysis.

With regard to prior art "Dip Estimation Algorithms", several techniques exist for estimating formation dip parameters using data from borehole imaging and logging instruments. Most of the algorithms use only a subset of the available image data, but some recent algorithms use all of the data provided by borehole imaging tools. Most of today's commercially available algorithms are well established, some having started their development in the 1960's [refer to the Allaud, Chemali, Hepp, Kemp, Moran, Schoonover, and the Vincent references in the reference section of this specification]. They were originally developed before modern wellbore imaging instruments, and were suitable for previous-generation dipmeter tools that acquire only a few channels of data around the borehole wall. Most of these algorithms comprise two steps at each processing depth: (1) a first step where signals acquired along the borehole axis are processed pairwise to estimate curve-to-curve shifts or offsets, for example, by pattern recognition or by finding the peak of a one-dimensional (ID) cross-correlation; and (2) a second step, generally a clustering algorithm, in which all of the offsets from the first step are collectively evaluated to develop an estimate of the formation dip. These methods, although well established in the industry, suffer from several disadvantages, including: (1) they make use of only a small subset of the data available with modern imaging tools; for example, consider the current FMI tool having 8 pads each with 24 buttons for a total of 192 channels of data azimuthally around the wellbore; current dip estimation algorithms typically use only 12 buttons of this data; and (2) they form dip estimates by bulk correlation of segments or zones of data, and thus are not suitable for evaluating individual dipping events such as fractures or individual dipping beds, or in zones where the dip angle varies quickly with depth.

Two more recent classes of dip estimation algorithms make use of the complete image. One class is based on transforms such as the Hough transform that are tuned to find high-contrast events lying along sinusoids in the image [refer to the "Hall" reference in the reference section of this specification], but these have very long computation times, too slow for real-time applications, and do not reliably handle non-sinusoidal events. Another class of algorithm has been developed by Elf [refer to the "Ye" reference in the reference section of this specification] that looks for sinusoidally oriented texture fields; these work well in finely-bedded formations but do not reliably handle isolated, clustered or bed-crossing fracture events.

In a later section of this specification, it is proposed to adapt and extend the Multi-Target Tracking (MTT) algorithm to a novel Multi-Sine Tracking (MST) algorithm, which is utilized in geometrically characterizing fracture, bedding or other approximately sinusoidal dip events in borehole images.

In the problem of borehole image dip estimation, there are potentially a large number of dip events to track and at each processing step a large number of competing hypotheses to handle. MST algorithms adapted from MTT algorithms can manage the combinatorial explosion intrinsic to tracking very large numbers (tens of thousands) of objects. As noted in the "Bar-Shalom" reference cited in the reference section of this specification, these algorithms have the potential to be quite complex because the tracking effort for n targets can be substantially more costly than n times the effort for a single target, because establishing the correspondence between targets and observations is not a trivial matter.

Accordingly, there is a need to utilize, in the oilfield domain, a modified version of the "Multi-Target Tracking" (MTT) algorithms which have been developed for military applications. The modified version of the MTT algorithm, here called the "Multi-Sine Tracking" (MST) algorithm, will be combined with conventional "Detection" and "Best Fit" algorithms to create an overall algorithm called the "Tracking Dip Estimator" (TDE) algorithm, which can be used in the oilfield domain in order to process borehole image data produced by a "borehole imaging tool", that represents images of variations on a borehole wall. Such images come, for example, from a Formation MicroImager (FMI) tool, ultrasonic USIT, azimuthal laterolog resistivity, logging while drilling resistivity at bit (i.e., LWD-RAB), etc. At a single azimuth in the borehole, the borehole imaging tool provides a "scan" of the borehole features along the direction of the borehole axis.

Borehole image processing carried out by the "Detection software" begins by processing the borehole image scan data at each scan azimuth to produce a plurality of image report data, or a set of "reports" at each scan azimuth. Such reports at each azimuthal scan direction are input to the Multi-Sine Tracking (MST) algorithm to recursively produce a plurality of confirmed "tracks", using a procedure adapted from that shown in FIG. 3.5 of Kurien, reproduced as FIG. 13a in this specification. For the MST algorithm as applied to borehole image data, the dynamic model for the target is no longer the model presented in equation 3.1 of Kurien, reproduced as equation A in this specification, but is instead a dynamic model that captures the sinusoidal activity or "dynamics" of borehole image dip events. As a final step of the TDE algorithm, each confirmed track corresponding to each dip event is input to a conventional "Best Fit" algorithm to determine the best fitting "dip data" d which are the parameters corresponding to the dip event that best fits each first output track.

SUMMARY OF THE INVENTION

Accordingly, it is a primary object of the present invention to disclose a "Tracking Dip Estimator (TDE)" algorithm, the main component of which is a modified version of a "Multi-Target Tracking (MTT)" algorithm hereinafter called the "Multi-Sine Tracking (MST)" algorithm, for use in the oilfield domain in order to process borehole image data for solving the dip estimation problem.

In accordance with the above object of the present invention, it is a primary aspect of the present invention to provide a TDE algorithm, which includes a novel "Multi-Sine Tracking software" obtained by modifying a Multi-Target Tracking algorithm, that is adapted to be stored in a memory of a computer system, such as a workstation, the TDE software instructing a workstation processor: (1) to process input borehole image data which was received from a borehole imaging tool and represents images of variations on a borehole wall, and, responsive thereto, (2) to produce: a "first output" representing a plurality of "tracks" (connected set of track points) representing a plurality of "dip events" in the borehole image data (i.e., a plurality of fractures or bed boundaries or other sinusoidally varying feature in the borehole image data); and to produce a "second output", in response to the "first output", representing a plurality of output dip data "d" corresponding, respectively, to the plurality of tracks generated by the "first output", the dip data "d" being the best fit parameters for each dip event of the plurality of dip events in the earth formation appearing on an internal wall of the borehole. The choice of "dip data" parameters is not unique, and may be, for example, the parameters for a plane or the parameters for a sinusoid, as will be described later in this specification.

It is a further aspect of the present invention to provide the novel TDE software adapted to be stored in the workstation memory for instructing the workstation processor to produce the "first output" and the "second output", the input borehole image data including a plurality of sinusoidal "dip events" possibly representing a plurality of fractures or bed boundaries in the earth formation, the Multi-Sine Tracking software included in the present invention using a predictive model that represents a new sinusoidal position on a sinusoidally varying track and a new sinusoidal slope on the sinusoidally varying track each as a function of the cosine and sine weighted sum of a previous sinusoidal position on the sinusoidally varying track and a previous slope on the sinusoidally varying track plus small quantities of noise to represent un-modeled effects.

It is a further aspect of the present invention to provide a TDE software adapted to be stored in the workstation memory for instructing a workstation processor to produce the "first output" including a plurality of tracks and the "second output" including the "dip data" d which are the parameters for a dip event that best fits each of the plurality of tracks, a substantial portion of the included Multi-Sine Tracking software of the present invention being represented by the following mathematical relations (hereinafter called the "sine-cosine model", where $T_n$ denotes the $n^{th}$ value of angular azimuth around the borehole, and $\delta_n = T_{n+1} - T_n$):

$$d(T_{n+1}) = \cos(\delta_n)d(T_n) + \sin(\delta_n)v(T_n) + \text{noise}$$

$$v(T_{n+1}) = -\sin(\delta_n)d(T_n) + \cos(\delta_n)v(T_n) + \text{noise}$$

wherein the dynamic model in the Multi-Sine Tracking software of the present invention as reflected in the above identified mathematical relations include a new sinusoidal position "$d(T_{n+1})$" on a sinusoidally varying track and a new sinusoidal slope "$v(T_{n+1})$" on the sinusoidally varying track each as a function of the cosine and sine weighted sum of a previous sinusoidal position "$d(T_n)$" on the sinusoidally varying track and a previous slope "$v(T_n)$" on the sinusoidally varying track plus small quantities of noise to represent unpredictable or unmodeled effects.

It is a further aspect of the present invention to provide the TDE software adapted to be stored in the workstation memory, including a conventional Detection software for instructing a workstation processor to produce a plurality of image edge element data or "reports" in response to a set of input "borehole image data", and a Multi-Sine Tracking software having as input the plurality of "reports" and producing the "first output" including a plurality of confirmed "tracks" in response to the plurality of reports, the Best Fit software then producing a "second output" including a plurality of "dip data" d which are the parameters for dip events that best fit each of the the plurality of tracks, the Multi-Sine Tracking software generating the "first output" by performing a recursive sine tracking function using the sine-cosine model in response to the plurality of reports obtained from the image Detection, and otherwise including the functionality of the Multi-Target Tracking (MTT) software described in Kurien.

In accordance with the primary object and the aspects of the present invention, a borehole imaging tool, such as Formation MicroImager (FMI) Tool, disposed in a borehole, will generate output data representing images of resistivity variations on a borehole wall (hereinafter, the "borehole image data"). This borehole image data is provided as input data to a computer system, such as a workstation, where the workstation stores therein a novel software known as the "Tracking Dip Estimator" software, which includes a "Detection software", a "Multi-Sine Tracking software" and a "Best Fit software". The "Detection software", the "Multi-Sine Tracking software" and the "Best Fit software" are stored on a program storage device, such as a CD-ROM; however, the CD-ROM is inserted into the workstation and, as a result, the "Detection software", the "Multi-Sine Tracking software" and the "Best Fit software" are loaded from the CD-ROM into the workstation memory for storage therein.

The borehole image data being input to the workstation computer system includes a representation of a plurality of "dip events" on the internal wall of the borehole (the dip events being either fractures or bed boundaries or other approximately sinusoidally varying features on the internal wall of the borehole). The "dip events" in the borehole image data, which may not be purely sinusoidal, can each be defined in terms of a "track", which is a connected set of track points lying on the dip event. Each dip event can also be defined in terms of the "dip data" d which is a set of parameters corresponding to a dip event that best fit the track points in each track. The choice of "dip data" parameters d is not unique, and may be, for example, the parameters for a plane or the parameters for a sinusoid, as will be discussed later in this specification.

The Multi-Sine Tracking software comprising one part of the TDE software stored in the memory of the workstation computer system consists of the main functional blocks of the Multi-Target Tracking (MTT) software shown in FIG. 13a, including the "Track Hypotheses Management" functional module shown in more detail in FIG. 13b, which includes the "Predict Track" and "Update Existing Track" modules of code which process a mathematical model for each track, these portions of code utilizing an embedded portion of code which is called the "sine-cosine model", the sine-cosine model being represented by the following two mathematical relations:

$$d(T_{n+1})=\cos(\delta_n)d(T_n)+\sin(\delta_n)v(T_n)+\text{noise}$$
$$v(T_{n+1})=-\sin(\delta_n)d(T_n)+\cos(\delta_n)v(T_n)+\text{noise}$$

where "$d(T_n)$" is a previous sinusoidal position on a track model, "$(T_n)$ is a previous slope on the track model, "$d(T_{n+1})$" is the new sinusoidal position on the track model, and "$v(T_{n+1})$" is the new slope on the track model.

When the workstation processor receives the input "borehole image data" provided by the borehole imaging tool (such as the FMI tool), it executes the Tracking Dip Estimator software, consisting of a first pre-processing step with a Detection software, followed by the novel Multi-Sine Tracking software of the present invention (having an embedded portion of code with the above referenced "sine-cosine model") for generating the "first output", and in a third step it executes the Best Fit software for generating the "second output". During the execution of the Detection software, the input borehole image data is converted by the Detection software (in conjunction with the workstation processor) into a set of image edge element data at each azimuth, called "reports". The set of reports at each azimuth is provided as an input to the Multi-Sine Tracking software of the present invention. During the execution of the Multi-Sine Tracking software, the workstation processor performs all of the functionalities of the known Multi-Target Tracking software as described in Kurien and shown in FIGS. 13a and 13b of the present specification; but the above referenced sine-cosine model is embedded in the "Predict Track" and "Update Existing Tracks" functions. The Detection and the MST functions performed by the workstation processor generate the "first output" comprising a plurality of sets of "tracks", each track being a set of connected track points which is approximately sinusoidal in nature.

For each approximately sinusoidal set of connected track points in the "first output", the Best Fit software of the workstation processor then determines the parameters for the best fitting dip event, where the choice of parameterization is not unique, but may be, for example, (1) the best fitting sinusoidal curve, where the sine curve is parameterized by its highest amplitude "A", the azimuth a on the sine curve where that highest amplitude "A" is located, for a particular depth "γ" in the borehole, in which case d=(γ,A,α), or (2) the best fitting plane, where the plane is parameterized by its tilt angle "η" relative to a plane perpendicular to the borehole axis, the rotation "α" of the tilted plane around the borehole axis, for a particular depth "γ" in the borehole, in which case d=($\sqrt[3]{}$,η,α),. Similar such dip data is determined for other dip events.

As a result, the "second output" is generated, the "second output" being a file representing a plurality of "dip data" d, associated, respectively, with a plurality of dip events in the borehole image data.

The "first output" representing the plurality of sets of tracks (each track being a set of connected track points) and the "second output" representing the plurality of "dip data" d are each provided as an "output" from the workstation by printing or displaying the plurality of tracks and the plurality of "dip data" on the workstation "recorder or display".

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 1 through 7 are used in a background and general discussion of the present invention, and wherein:

FIG. 1 illustrates how inclined events correspond to sinusoidal features in borehole images;

FIG. 2 illustrates target position versus time;

FIG. 3 illustrates wellbore target position versus azimuth;

FIG. 4 illustrates a radar sensor signal in time and processed reports;

FIG. 5 illustrates multiple reports at time $T_1$ which have ambiguous association with reports at time 0;

FIG. 6 illustrates three reports from a single vertical channel of processed FMI sensor data;

FIG. 7 illustrates multiple reports at time $T_1$ which have ambiguous association with reports at time 0;

FIGS. 13a, 13b, and 13c illustrate the functional decomposition of the Multi-Sine Tracking algorithm (FIG. 13a), adapted from the Multi-Target Tracking algorithm, and the Track Hypotheses Management module (FIGS. 13b and 13c) of the present invention, where the "Predict Tracks" and "Update Existing Tracks" blocks of the Track Hypotheses Management module of FIGS. 13b and 13c uses the "sine-cosine model" of the present invention which represents part of the Track Hypotheses Management algorithms of the present invention;

FIG. 15 illustrates the recorder or display of the computer system of FIG. 10a and how the recorder or display will record or display the "two outputs" of FIG. 14: (1) the plurality of sets of connected track points, and (2) the corresponding plurality of dip data.

DETAILED DESCRIPTION OF THE PREFERRED EMBODIMENT

The remaining sections of this specification will be divided into two parts:

(1) a Background and General Discussion of the present invention, and (2) a Detailed Discussion of the present invention:

Background and General Discussion of the Present Invention

Figure 1:
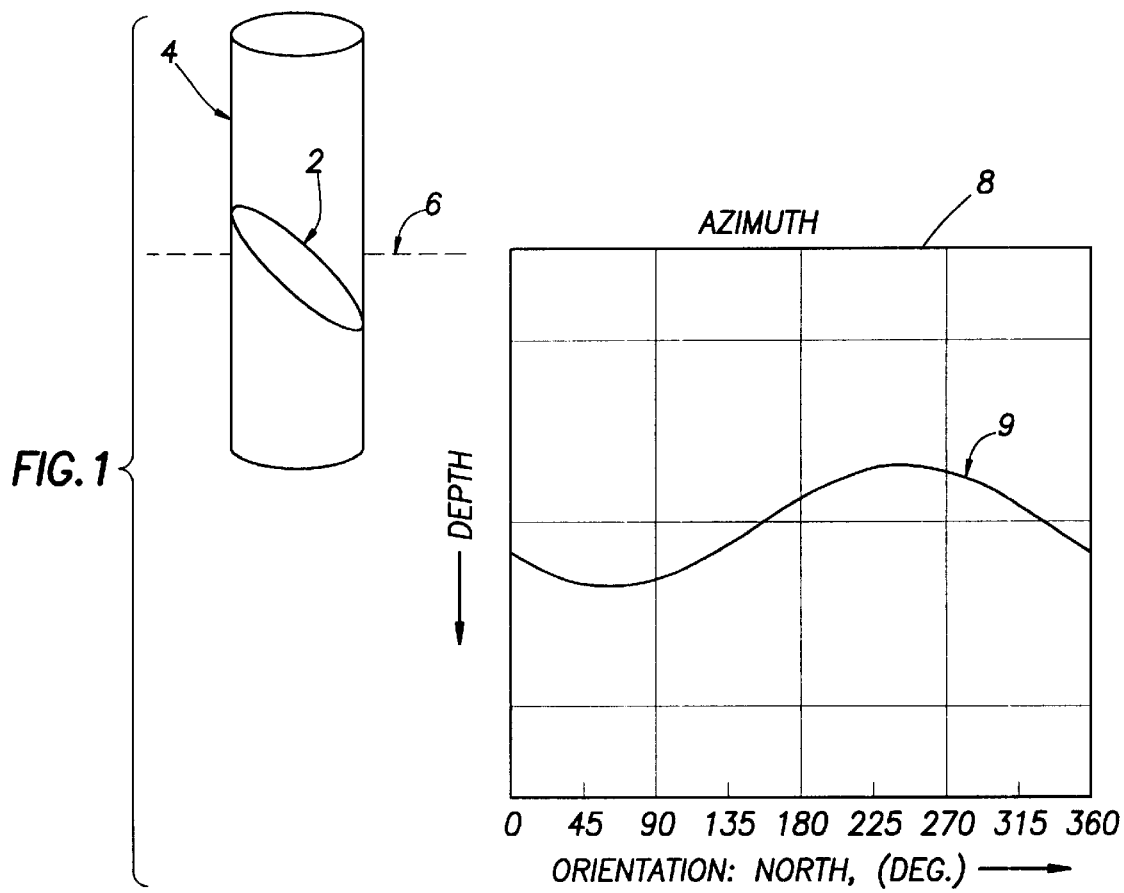

Referring to FIG. 1, as noted earlier, a "dip event" 2 in a borehole 4 may be inclined relative to a horizontal line 6 passing through the borehole 4. A "dip event" may be, for example, a fracture or a bed boundary or other sinusoidally varying feature appearing on the internal wall of the borehole 4. If the "dip event" 2 is plotted on a 2-D map 8 of depth versus azimuth, the dip event 2 would appear to be an approximately sinusoidally varying function 9. This phenomenon will be discussed below with reference to FIGS. 9a–9c.

Figure 2:
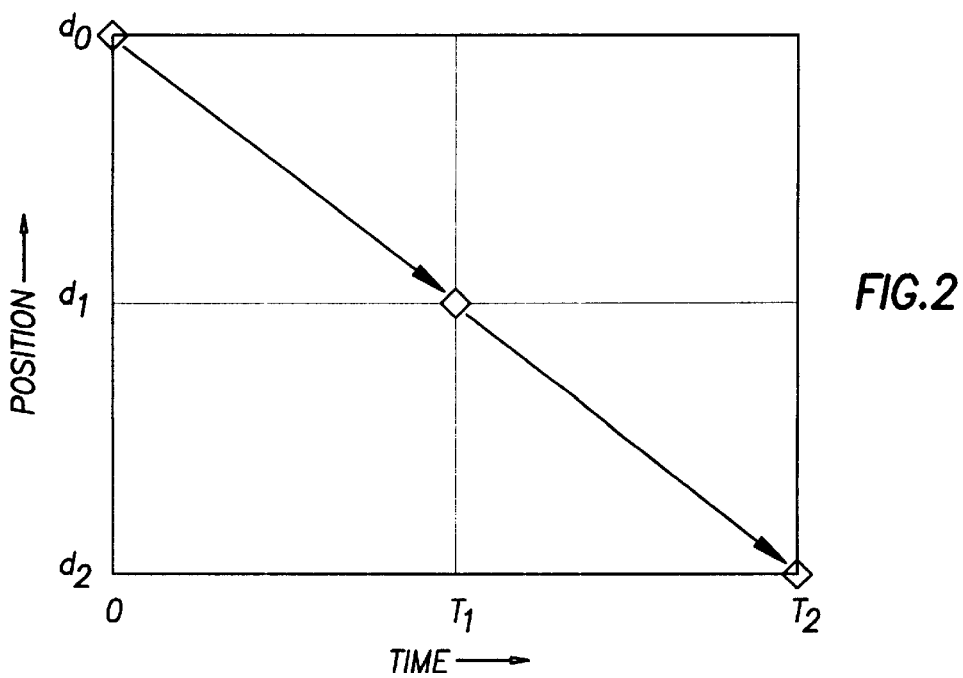

Referring to FIG. 2, in the following paragraphs, we review the basic notions of "Multi-Target Tracking" (MTT). In tracking, a target is an individual object such as an airplane or missile. As illustrated in FIG. 2, suppose at an initial time t=0 the target is located at a distance do from the sensor such as a radar. At a later time t=$T_1$, the target has moved to a new position at a distance $d_1$ from the radar, and at a still later time t=$T_2$, the target is located at a distance $d_2$ from the radar. In the simplest scenario, the target is moving along a straight track as illustrated.

Let the independent variable t represent time, and let the target state versus time be denoted as X(t). The target state X(t) is usually a vector of two numbers representing the target's position d(t) (distance from the sensor) and velocity v(t) (change in the distance from the sensor) at time t, that is, X(t) may be written as a 2-element vector containing the position d(t) and velocity v(t):

$$X(t) = \begin{pmatrix} d(t) \\ v(t) \end{pmatrix}$$

Due to the straight-line nature of the target movement as illustrated in FIG. 2, the target model for X(t) as a function of time t may be represented by a linear set of two equations. Because a mathematical model can never precisely capture every detail of a real moving target, the target movement or dynamics models are usually written with some amount of added noise to represent uncertainties, that is, they are statistical target models, such as:

$$d(T_{n+1}) = d(T_n) + \delta_n v(T_n) + \text{noise}$$

$$v(T_{n+1})=v(T_n)+\text{noise}$$

where $\delta_n=T_{n+1}-T_n$. In other words, when traversing from one time $t=T_n$ to a time $t=T_{n+1}$ which is a time interval $\delta_n$ later, the new target position $d(T_{n+1})$ equals the old target position $d(T_n)$, plus the change in position given by multiplying the velocity $v(T_n)$ times the time increment $\delta_n$, plus a small quantity of noise to represent unpredictable or unmodeled effects. The new target velocity $v(T_{n+1})$ equals the old target velocity $v(T_n)$ plus a random perturbation in velocity due to target acceleration, which is modeled as another random noise term.

Figure 3:
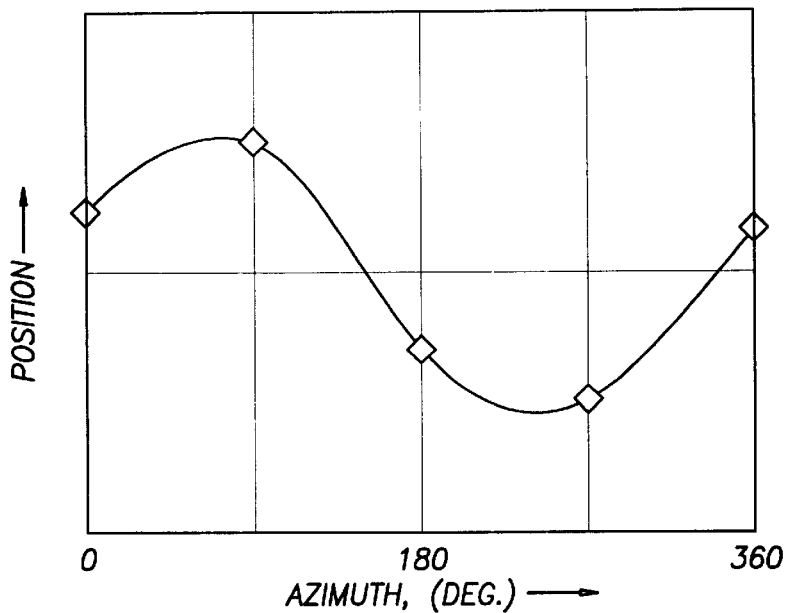

Referring to FIGS. 1 and 3, for the borehole image problem, a planar geometric event such as a bed boundary sweeps out a sinusoidal trace around the cylindrical borehole wall from 0 degrees to 360 degrees, as illustrated in FIG. 3. To develop algorithms to track geological features in borehole imagery, a statistical target model $X(t)$ must be developed. In this case, the independent variable t represents angular position or azimuth around the borehole wall with respect to some reference (e.g. North or top of hole), and the state $X(t)$ is a vector or set of numbers characterizing, for example, the position $d(t)$ and the slope $v(t)$ of the sinusoidal trace of the borehole image event, hereafter referred to as a "target".

Due to the sinusoidal nature of the bed boundary "target" behavior as illustrated in FIG. 3, the statistical target model $X(t)$ as a function of azimuth t may be represented by another linear set of two equations corresponding to a second-order oscillator [see the "Gelb" reference below in the "references" section of this specification], hereinafter called the "sine-cosine model":

$$d(T_{n+1})=\cos(\delta_n)d(T_n)+\sin(\delta_n)v(T_n)+\text{noise} \quad (1a)$$

$$v(T_{n+1})=-\sin(\delta_n)d(T_n)+\cos(\delta_n)v(T_n)+\text{noise} \quad (1b)$$

In other words, in traversing from one azimuth $t=T_n$ to an azimuth $t=T_{n+1}$, which is a azimuthal angular increment $\delta_n=T_{n+1}-T_n$ to the right, the new sinusoid position $d(T_{n+1})$ and the new sinusoid slope $v(T_{n+1})$ equal the cosine- and sine-weighted sum of the previous sinusoid position $d(T_n)$ and slope $v(T_n)$, plus small quantities of noise to represent unpredictable or unmodeled effects. These two equations correspond to a second-order harmonic sine-cosine oscillator plus noise.

Referring to FIGS. 2 and 3, the airplane and bed boundary tracks shown in FIGS. 2 and 3 represent "reality", and are never available unambiguously to the observer. Instead, the observer acquires a set of measurements, such as radar signals or borehole images, which contain within them some information about the objects under study, but also may contain spurious information.

Figure 4:
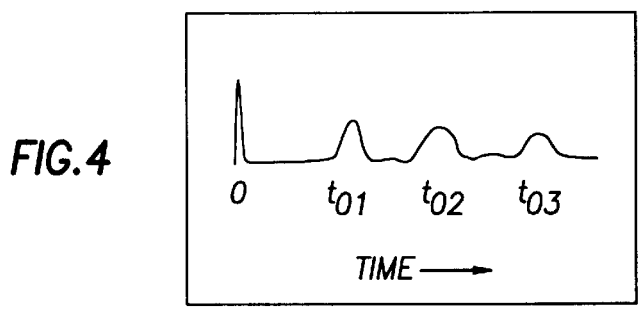
Figure 5:
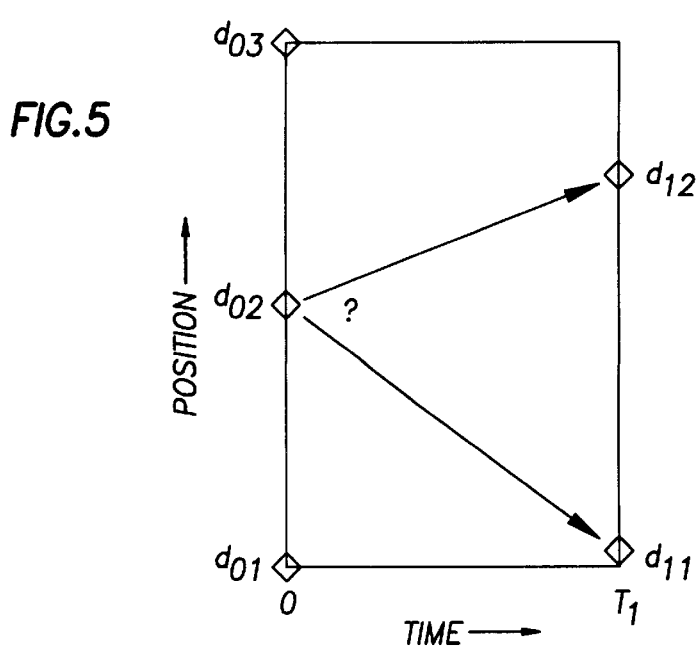

Referring to FIGS. 4 and 5, for example, consider first the radar problem. Suppose at time t=0, the radar sends out an electromagnetic pulse, and receives a sensor signal as shown in FIG. 4, which might correspond to the amplitude of the reflected radar signal as a function of time. Based on a suitable mathematical model that describes how a radar responds to a target, this sensor signal is processed by a "detector" to obtain a set of time "reports" $t_{01}$, $t_{02}$, $t_{03}$, etc, as shown in FIG. 4. Accounting for the speed of propagation of the radar pulse through air, each of the radar time reports corresponds to a target radar position report $d_{01}$, $d_{02}$, $d_{03}$ at time t=0, as illustrated in FIG. 5. At the next time step $t=T_1$, suppose the sensor data are processed and they provide two possible radar position reports $d_{11}$ and $d_{12}$, as shown in FIG. 5.

Figure 13A:
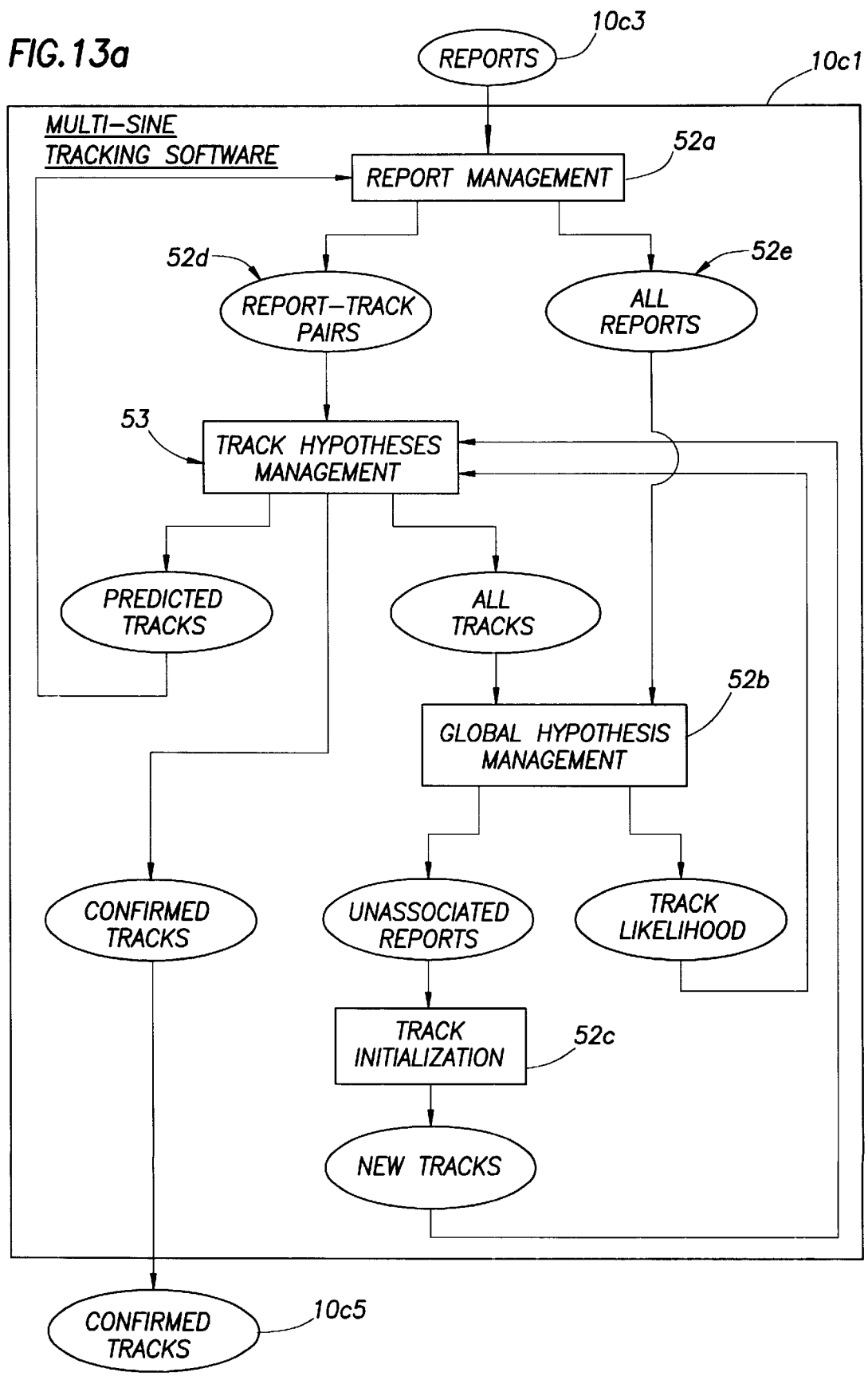
Figure 13B:
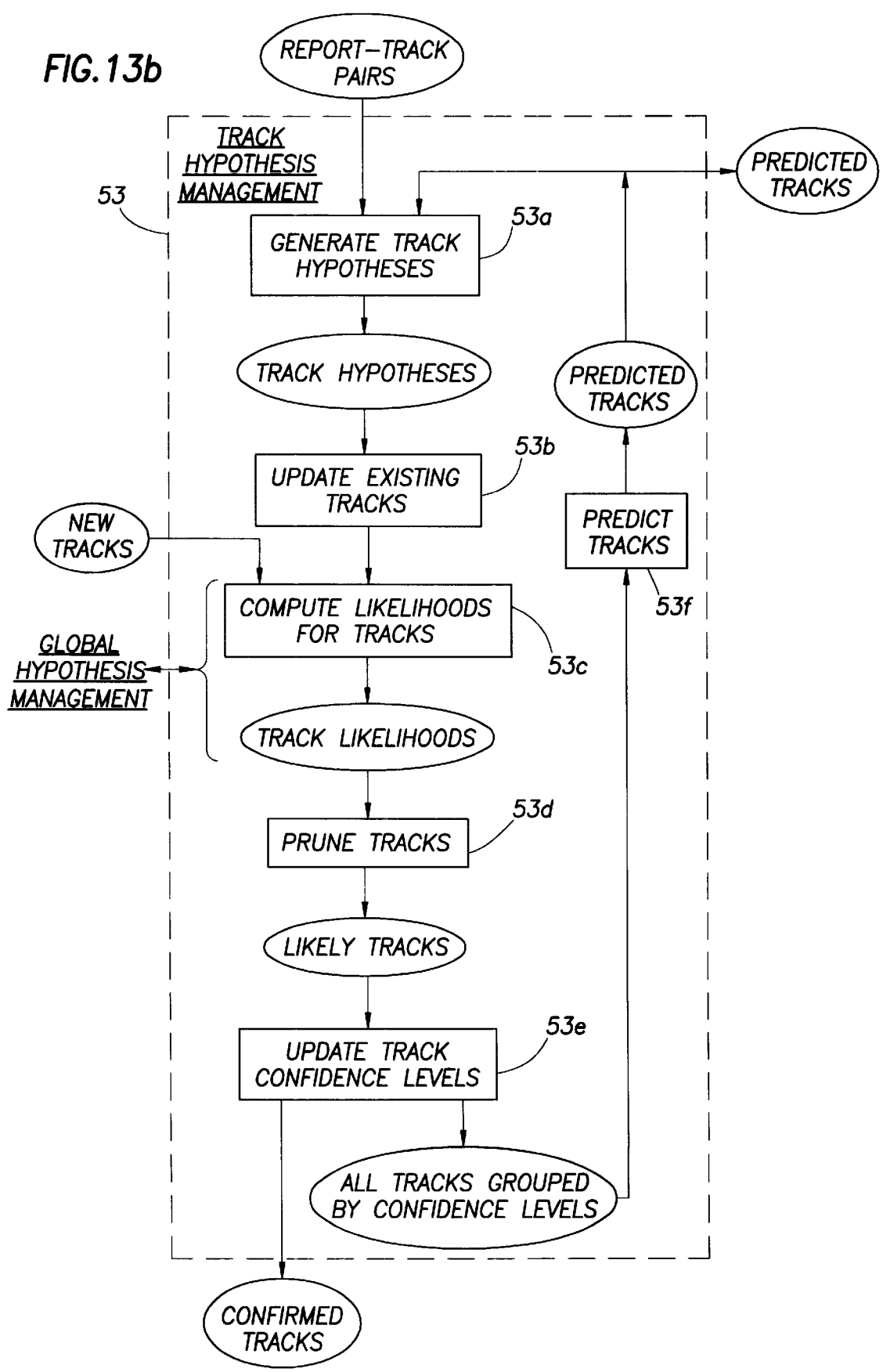

Given multiple reports $d_{jk}$ at different times as shown in FIG. 5, the essential problem is to estimate the target state $X(t)$ at each time t. What makes the MTT problem difficult is that there may be multiple targets i and corresponding states $X_i(t)$ to estimate, and there is little or no prior knowledge concerning which of the many reports $d_{jk}$ goes with which targets i. Further, some of the reports may be spurious, due to noise, and should not be correlated with any target. In the field of multi-target tracking (MTT), a functional approach has been developed called "Track Hypotheses Management" (see the "Kurien" reference cited below), whose functional decomposition is shown in FIGS. 13a and 13b of this specification, that effectively handles the problem of reconciling many target reports with many moving targets.

Figure 6:
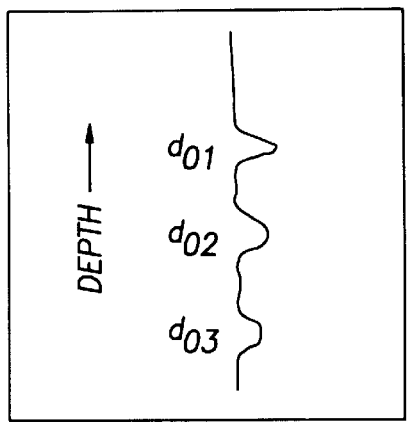
Figure 7:
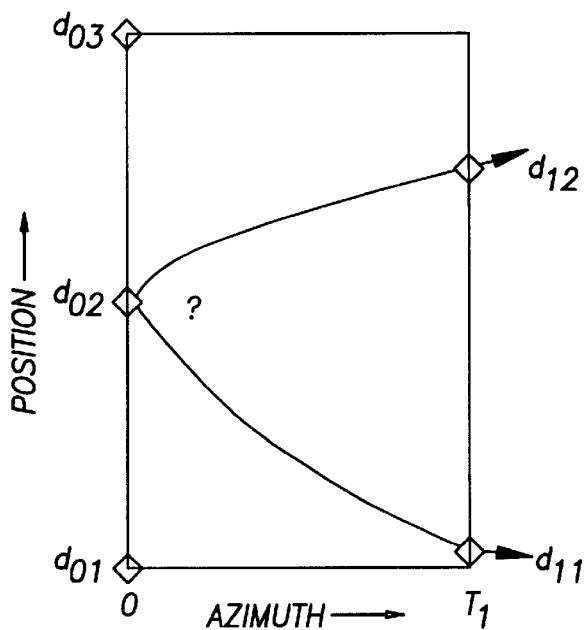

Referring to FIGS. 6 and 7, consider now the borehole image problem. Suppose at a first azimuth t=0 around the borehole, the downhole imaging tool measures a "scan" or sensor signal as shown in FIG. 6, which might correspond to the electrical current flowing into an FMI sensor button [see the "Ekstrom" reference cited below] sliding along the borehole wall as a function of vertical position along the wellbore axis. Based on a suitable mathematical model that describes how an FMI responds to a "dip event" like a fracture or bed boundary, this sensor signal is processed with a "Detection software" to obtain a set of "reports" $d_{01}$, $d_{02}$, $d_{03}$, etc, as shown in FIG. 6, which correspond to possible positions of the sinusoidal dip event at azimuth t=0, as illustrated in FIG. 7. At the next azimuthal incremental step $t=T_1$, suppose the sensor data are processed and they provide two possible dip event "reports" $d_{11}$ and $d_{12}$, as shown in FIG. 7.

As with the radar problem, there may be multiple dip event targets i and corresponding states $X_i(t)$ to estimate, and little or no prior knowledge is available about which of the many reports $d_j$ is associated with each target. Again, some of the reports may also be spurious, due to noise, and should not be correlated with any target. In the dip event problem, the connections from one azimuth to another are sinusoidal connections as shown in FIG. 7 using the "sine-cosine model" equations shown above in equations (1a) and (1b), as opposed to straight line connections shown in FIG. 5.

One difference between traditional MTT and the oilfield Multi-Sine Tracking problem is that the borehole is cylindrical, so that as the processing recursively advances azimuthally around the borehole, after 360 degrees of rotation, it arrives back at the starting point. That is, the tracking problem implemented around the borehole will necessarily come back onto itself after a complete rotation. Because of this, tracks exiting the right side of a strip of borehole imagery at 360 degrees azimuth must re-enter with the same position and slope on the left side of the imagery at 0 degrees. This fact provides a firm processing boundary condition that is not present in the conventional MTT applications. This processing boundary condition is incorporated in the oilfield MST processing during the determination of the "first output" of confirmed tracks. By recursing several times around the borehole, the "Multi-Sine Tracking (MST)" algorithm is capable of further refining the track estimates.

In MTT, there is generally more measurement information available about a target than simply its position as shown in FIG. 5. Radar processing can provide detail about the type of reflective surface, or there may be additional outside information transmitted by the aircraft to indicate whether it is friendly or hostile. Such supplemental information provides very strong additional constraint information in the "Track Hypotheses Management" module, to help improve the resolution of ambiguities in associating multiple reports with multiple targets.

In "Multi-Sine Tracking" of borehole images, there is also generally more measurement information available about a dip event target than simply its position as shown in FIG. 7. FMI processing can provide detail about the dip event electrical conductivity, conductivity contrast and direction of contrast change (e.g. positive- or negative-going unidirectional variation associated with a bed boundary or di-directional variation associated with a fracture) across the dip event. Other measurements, such as nuclear or acoustic data, can provide additional so-called petrophysical information such as rock type, porosity, texture or pore-filling fluid types, which provide additional constraint information when resolving ambiguities in associating multiple reports with multiple dip event targets. The MST algorithm can be refined to make use of all available information by introducing this auxiliary information into the Track Hypotheses Management computation.

Detailed Discussion of the Present Invention

The method and apparatus of the present invention uses modified Multi-Target Tracking concepts to generate a plurality of tracks (sets of connected track points), representing dip events in borehole imagery from a borehole penetrating an earth formation, and a corresponding plurality of dip data, defining the "best fit" sine curves to a plurality of tracks, in response to a set of "borehole image data".

Figure 8:
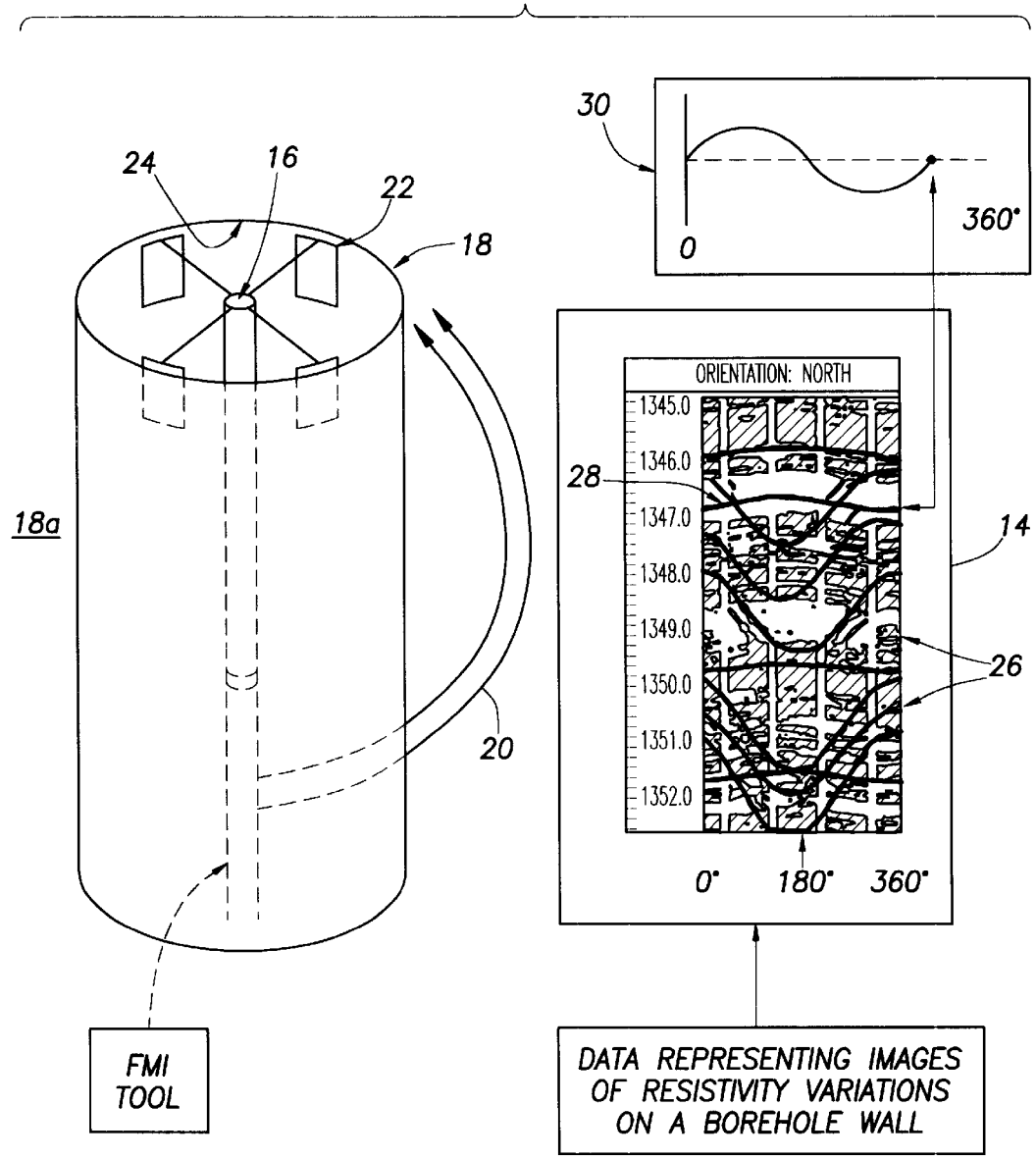
FIG. 8 illustrates how a borehole imaging tool, such as a Formation Microimager Tool, generates "borehole image data", that is, data representing images of resistivity variations on a borehole wall.

Referring to FIG. 8, an apparatus for generating the "borehole image data", representing images of resistivity variations on a borehole wall, is illustrated.

In FIG. 8, as noted earlier, the method and apparatus of the present invention generates a plurality of tracks and a corresponding plurality of dip data in response to a set of "borehole image data". The "borehole image data" (representing images of resistivity variations on a borehole wall) is generated by a borehole imaging tool, and that borehole imaging tool could be, for example, a "Formation MicroImager" (FMI) borehole imaging tool. The Formation Microimager borehole imaging tool is used by Schlumberger Technology Corporation, Houston, Tex. However, other borehole imaging tools could also be used to generate the "borehole image data". For example, other such borehole imaging tools include an ultrasonic USIT, azimuthal laterolog resistivity, logging while drilling at bit (LWD-RAB), etc. All of these other borehole imaging tools generate borehole image data for which the method and apparatus of the present invention applies.

In FIG. 8, a Formation MicroImager (FMI) borehole imaging tool 16 is shown disposed in a borehole 18. This tool 16 is an electrical tool, in that an electric current is injected into the earth formation 18a (see electric flux lines 20) and a set of pads 22 on the tool 16 receive the return current through the earth formation 18a, the return current received by the pads 22 being representative of and being a function of the resistivity variations within the earth formation 18a. The pads 22 will produce an image 26 of the physical structure of the internal portion of the borehole wall 24, the physical structure of the internal borehole wall 24 including a plurality of "dip events", such as fractures and/or bed boundaries or other sinusoidally varying features which will be visible on the image 26. The plurality of dip events on the image 26 will appear to be approximately "sinusoidal" in shape. For example, consider the single dip event 28 on the image 26 in FIG. 8. The dip event 28 in FIG. 8 is approximately "sinusoidal" in shape, as indicated by the sinusoid appearing in box 30 of FIG. 8. In fact, each of the dip events in the borehole wall image 26 of FIG. 8 can be approximated by a sinusoidal waveform, as discussed in more detail later in this specification.

Figure 9A:
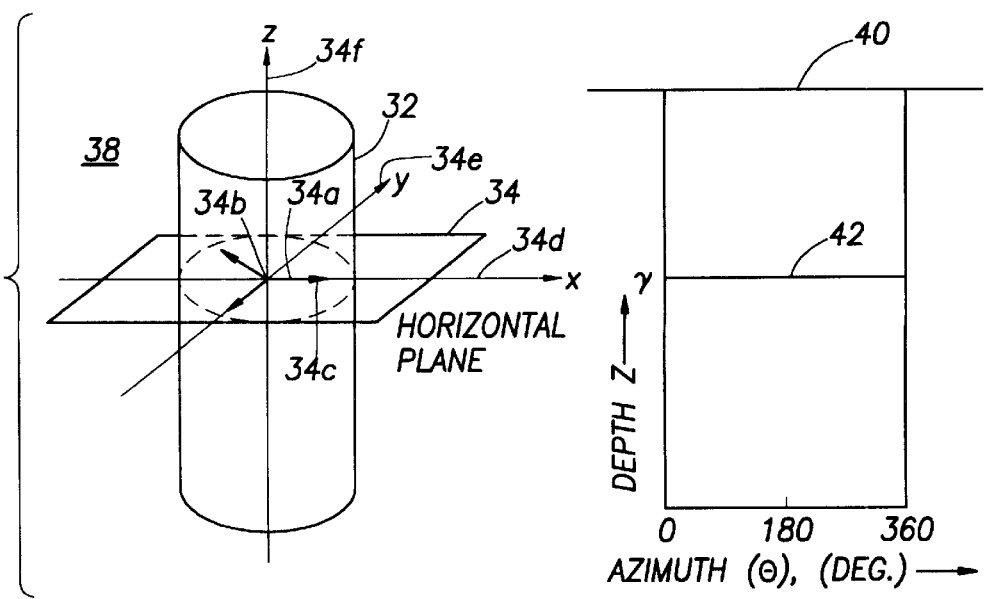
FIGS. 9a through 9c illustrate how Earth formation dip events (e.g., fractures or bed boundaries) which are perpendicular to the borehole can be represented by a straight line function and how other formation dip events which are disposed at an angle relative to the borehole can be represented by an approximate sinusoidal function that can be defined by an amplitude "A" occurring at an azimuth a at a particular depth "z" in the borehole.

Referring to FIG. 9a, recall from FIG. 1 that a dip event 2, which is inclined relative to the horizontal line 6, in the borehole 4 produces a curve on a plot 8 which appears to be an approximately sinusoidally shaped waveform 9 of depth versus azimuth (where azimuth is defined to be the angle in degrees from zero to 360 around the internal periphery of the borehole 4). The following paragraphs will reveal why each of the dip events in the borehole image 26 of FIG. 8 (which represent dip events 2 that are inclined relative to the horizontal line 6 of FIG. 1) can be approximated by a curve which appears to be a sinusoidally shaped waveform, and how this representation relates to the choice of "dip data" parameters in "d".

In FIG. 9a, a borehole 32 is illustrated and a plane 34 intersects the borehole 32, the plane 34 representing bed boundaries or fractures in the earth formation 38 penetrated by the borehole 32. Assume the plane 34 is perpendicular to the axis 34f of the borehole 32, and assume an arrow 34a rotates about a central point 34b in the plane 34. As the arrow 34a rotates about the central point 34b in the plane 34, since the plane 34 is disposed at right angles with respect to the borehole 32, the head 34c of the arrow does not rise or fall longitudinally during the angular rotation of arrow 34; that is, the longitudinal position of the head 34c remains constant during its angular rotation. Referring to the depth versus azimuth chart 40 in FIG. 9a, since the longitudinal position of the head 34c of the arrow 34a remains constant during its angular rotation, a line 42 in the depth versus azimuth chart 40, which corresponds to the rotation of the arrow 34a in plane 34, is represented by a "straight line" (illustrating no up and down movement of the head 34c of the arrow 34a during its angular rotation in plane 34).

In FIG. 9a, there are a set of orthogonal reference axes, with the x-axis 34d and y-axis 34e perpendicular to the z-axis 34f which is oriented along the borehole axis. Because the plane 34 lies perpendicular to the borehole axis 34f, it lies parallel to the xy plane defined by the x-axis and y-axis. The plane 34 is specified by the set of all the (x,y,z) points satisfying the equation:

$$z = \gamma \qquad (9.1)$$

where $\gamma$ is the z value where the plane 34 intersects the borehole axis 34f. Referring to the depth versus azimuth chart 40 in FIG. 9a, the straight line 42 is therefore positioned at depth level y.

Figure 9B:
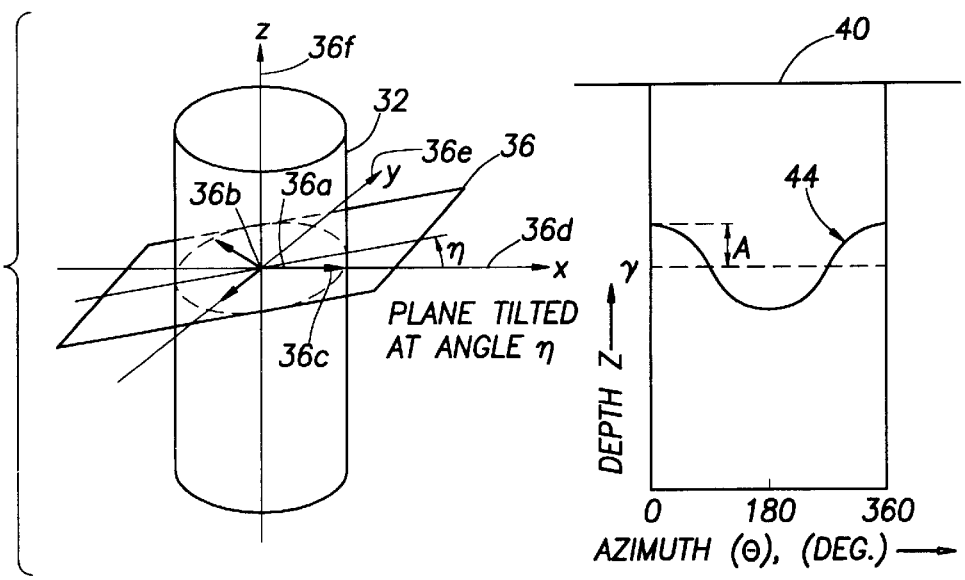

Referring to FIG. 9b, there a plane 36 which is not perpendicular to the axis of the borehole 32; rather, the plane 36 is disposed at a tilt angle Ti so that it is inclined and for positive values of x it lies above the x-axis 36d and for negative values of x it lies below the x-axis 36d. The plane 36 may be specified by all the (x,y,z) points satisfying the equation:

$$z = \gamma + \psi x \qquad (9.2)$$

where $\gamma$ is the z value where the plane 36 intersects the borehole axis 36f, and $\psi$ is the slope of the tilted plane 36, defined so that $$\psi = \tan \eta \qquad (9.3)$$

where $\eta$ is the angle of the tilt of the plane 36.

Assume that an arrow 36a rotates about a central point 36b in the tilted plane 36, so that the arrow head 36c touches the borehole wall. As the arrow 36a rotates about the central point 36b in the plane 36, since the plane 36 is disposed at a tilt angle η with respect to the borehole 32, the head 36c of the arrow 36a will rise and fall longitudinally during the angular rotation of the arrow 36a. In fact, during its angular rotation, the arrow head 36c will plot out and define a curve that corresponds to a sinusoidal waveform. To see this, consider the circularly cylindrical borehole of radius r to be the set of all (x,y,z) points satisfying the equation:

$$x^2 + x^2 = r^2. \qquad (9.4)$$

As the arrow head 36c moves around the borehole 32 sweeping out an angle from 0 to 360 degrees of rotation θ, the (x,y,z) points on the borehole also satisfy the equations:

x=r cos θ y=r sin θ  (9.5)

for θ varying from 0 to 360 degrees.

The set of all points swept out by the arrow head 36c as it rotates around the borehole is given by the set of all (x,y,z) points that simultaneously lie on the tilted plane 36 specified by equation (9.2) and on the cylindrical borehole 32 specified by the equation (9.5). The set of points that simultaneously lie on both the plane 36 and the borehole 32 may be found by substituting equation (9.5) into equation (9.2):

$$z = \gamma + \psi r \cos \theta \qquad (9.6)$$

In FIG. 9b, in the depth versus azimuth chart 40, the line 44 which corresponds to the rotation of arrow 36a in plane 36 thus takes the shape of a sinusoidal waveform 44 as a consequence of equation (9.6) (illustrating a definite up and down movement of the head 36c of the arrow 36 during its angular rotation in the plane 36). In the depth versus azimuth chart 40 of FIG. 9b, referring to the sinusoidal waveform 44, this sinusoidal waveform 44 can be defined by its highest amplitude "A", which occurs at azimuth θ=0, and its depth "γ" in the borehole.

Figure 9C:
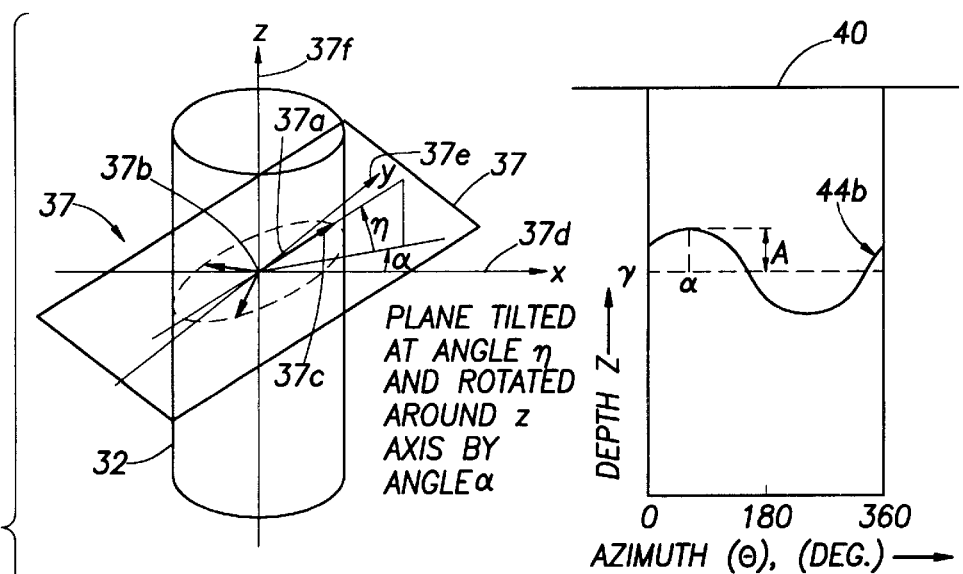
Figure 9C:
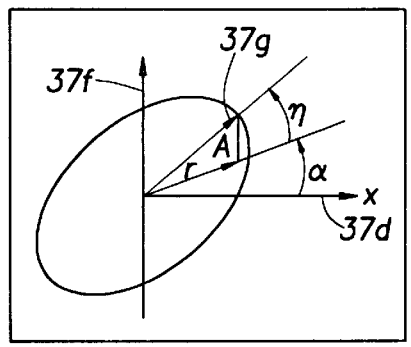
Figure 9C:
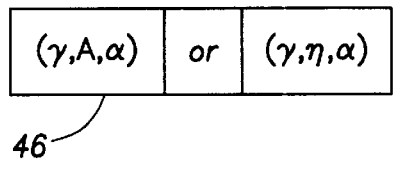

Referring to FIG. 9c, there is another plane 37, which is not perpendicular to the axis of the borehole 32. The tilted plane 37 is disposed at a tilt angle 77 (which is the same as the case of plane 36 in FIG. 9b), and is also rotated around the z-axis by a rotational angle α. The plane 37 is specified by all the (x,y,z) points satisfying the equation for a plane:

z=γ+δx+βy

=γ+[tan η cos α]x+[tan η sin α]y  (9.7)

where the variable γ denotes the value along the z axis 37f where the plane 37 intersects, and tan η is the slope of the tilted plane 37. A shorthand notation which defines the equation for the tilted plane 37 in FIG. 9c is defined using the parameters in equation (9.7) as follows:

dip data parameters: (γ,η,α)  (9.7a)

The triplet (γ,η,α) is one of the possible choices for the "dip data" parameter "d", and this is indicated by element numeral 46 in FIG. 9c.

In FIG. 9c, in the borehole 32, assume that an arrow 37a rotates about a central point 37b in the tilted plane 37, so that the arrow head 37c touches the borehole wall. As the arrow 37a rotates about the central point 37b in the plane 37, since the plane 37 is disposed at a tilt angle η with respect to the borehole 32, the head 37c of the arrow 37a will rise and fall longitudinally during the angular rotation of the arrow 37a. As shown in the inset of FIG. 9c, when the arrow 37a is oriented at an angle α with respect to the x axis 37d, it is oriented in the direction of maximal slope up the plane 37; at this point, the arrow head 37g lies a distance A above the xy plane and lies a distance r from the borehole axis 37f, so the tilt angle η satisfies $$\tan \eta = \frac{A}{r} \qquad (9.8)$$

The set of all points swept out by the arrow head 37c as it rotates around the borehole sweeping out an angle from 0 to 360 degrees of rotation, is given by the set of all (xy,z) points that are simultaneously on the tilted plane 37 specified by equation (9.7) and on the borehole cylinder 32 specified by equation (9.5). The set of points that simultaneously lie on both the plane 37 and the borehole 32 may be found by substituting equations (9.5) and (9.8) into equation (9.7):

$$\begin{aligned} z &= \gamma + \left[\frac{A}{r}\cos\alpha\right]x + \left[\frac{A}{r}\sin\alpha\right]y \\ &= \gamma + A\cos\alpha\cos\theta + A\sin\alpha\sin\theta \\ &= \gamma + A\cos(\theta - \alpha) \end{aligned} \qquad (9.9)$$

In FIG. 9c, in the depth versus azimuth chart 40, the line 44b which corresponds to the rotation of arrow 37a in plane 37 thus takes the shape of a sinusoidal waveform 44b as a consequence of equation (9.9). In the depth versus azimuth chart 40 of FIG. 9c, referring to the sinusoidal waveform 44b, this sinusoidal waveform 44b can be defined by its highest amplitude "A", which occurs at azimuth θ="α", and its depth "γ" in the borehole. A shorthand notation which defines the sinusoidal waveform 44b of FIG. 9c is defined using the triplet of parameters of equation (9.9) as follows:

Dip data parameters: (γ,A,α)  (9.9a)

The triplet (γ,A,α) is an alternative way to specify the "dip data" parameter d. This alternative is shown in element numeral 46 in FIG. 9c. Because the choice of "dip data" parameters d shown element 46 is not unique, the remainder of this specification will be described in terms of one choice of parameters, namely the shorthand notation (γ, A, α) corresponding to the parameters of a tilted plane as described above, although it is to be understood that other choices of "dip data" parameters may equivalently be chosen.

Figure 10A:
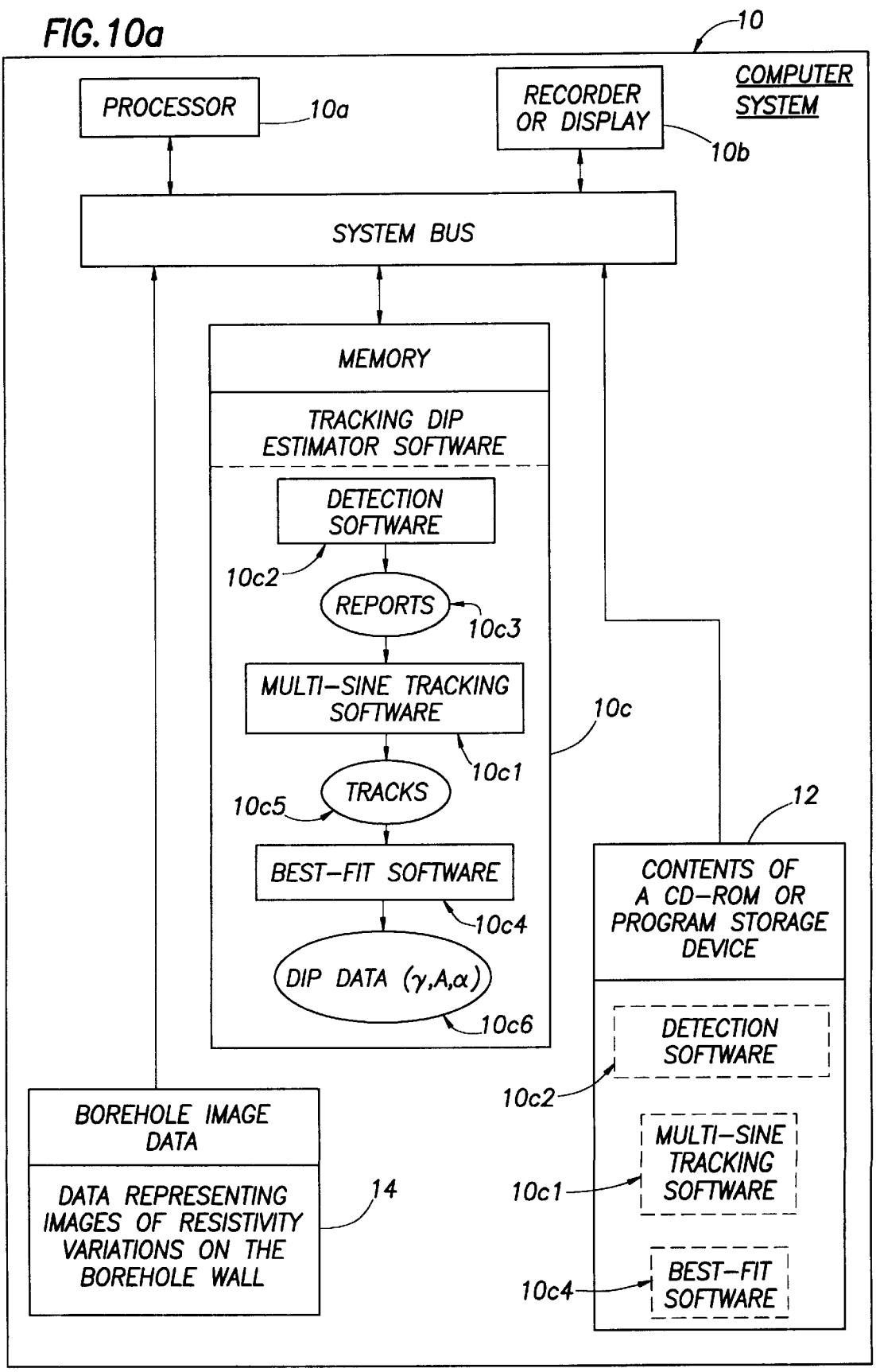
FIG. 10a illustrates a computer system, such as a workstation, which receives certain input data and stores the Detection software, the "Multi-Sine Tracking software" and the "Best Fit" software of the present invention.

Referring to FIG. 10a, a computer system 10 includes a processor 10a connected to a system bus, a recorder or display 10b connected to the bus, and a memory 10c connected to the bus which is adapted for storing a "Tracking Dip Estimator" software comprising a "Detection software" and the "Multi-Sine Tracking" software and the "Best Fit software" of the present invention. The computer system 10 may be a personal computer (PC), a workstation, a mainframe, etc. Examples of possible workstations include Silicon Graphics Indigo 2 workstation and a Sun SPARC workstation. The processor 10a may be, for example, a microprocessor, micro-controller, or a mainframe or workstation processor. The memory 10c may be, for example, a hard disk, a ROM, CD-ROM, DRAM, or other RAM, flash memory, magnetic storage, optical storage, registers, or other volatile and/or non-volatile memory. A novel software in accordance with the present invention, hereinafter known as the "Multi-Sine Tracking software" 10c1, is initially stored on a program storage device 12, such as a CD-ROM 12, the Multi-Sine Tracking software 10c1 being loaded from the program storage device 12 into the computer system 10 for storage in the memory 10c of the computer system 10. In addition, another software package known as the "Detection software" 10c2 is also initially stored on the program storage device 12 and is loaded from the program storage device 12 into the memory 10c of the computer system 10, as illustrated in FIG. 10a. In addition, another software package known as the "Best Fit software" 10c4 is also initially stored on the program storage device 12 and is loaded from the program storage device 12 into the memory 10c of the computer system 10, as illustrated in FIG. 10a. A plurality of "input data" 14, hereinafter called "borehole image data" 14, is provided to the computer system 10 of FIG. 10a, the "borehole image data" 14 including "data representing images of resistivity variations on a borehole wall". The "borehole image data" 14 was originally generated by an electrical, acoustic or other borehole imaging tool, such as a Formation MicroImager (FMI) discussed above with reference to FIG. 8.

When the Detection software 10c2, the Multi-Sine Tracking software 10c1, and the Best Fit software 10c4 of the present invention are loaded into the memory 10c, the processor 10a will respond to the "borehole image data" 14 by first executing the Detection software 1c2. During execution of the Detection software 10c2, the processor 10a will convert the borehole image data 14 into another set of image edge element data called "reports" 10c3. The reports 10c3 are then used by the processor 10a during the execution of the Multi-Sine Tracking software 10c1 of the present invention to generate a "first output" including a plurality of tracks 10c5, to be discussed later in this specification. The plurality of tracks 10c5 are then used by the Best Fit software 10c4 of the present invention to generate a "second output" d comprised of a plurality of dip data 10c6, corresponding, respectively, to the plurality of tracks 10c5, each of the plurality of dip data corresponding to a particular track having the following format ($\gamma$, A, $\alpha$) where "$\gamma$" is the depth in the borehole and "$\alpha$" is the azimuth in degrees around the borehole where the amplitude of the particular set of connected track points is the greatest or highest and "A" is the amplitude of the particular set of connected track points at that azimuth "$\alpha$".

Figure 10B:
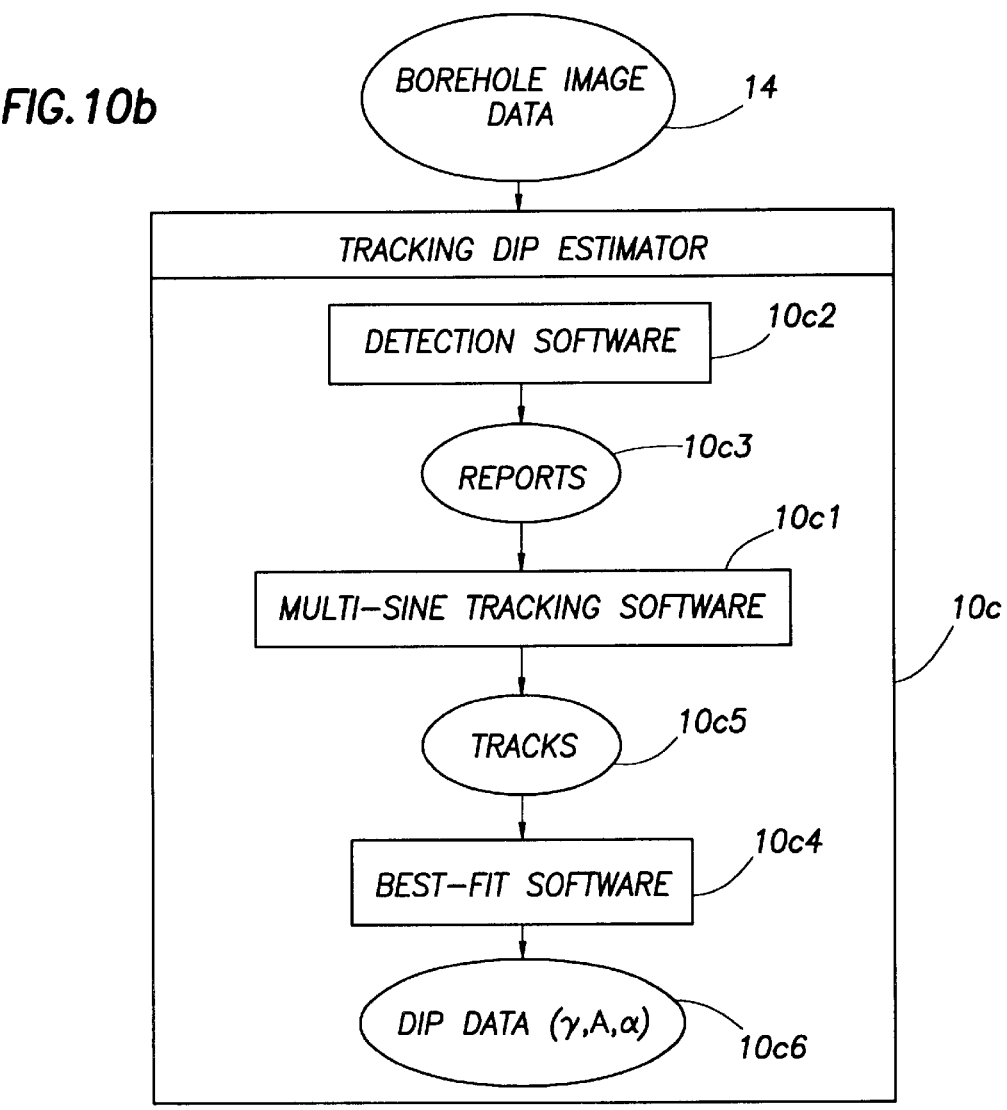
FIG. 10b illustrates how the borehole image data is provided as an input to the Detection software, the Detection software generating the reports which are used by the Multi-Sine Tracking software of the present invention to generate the first output representing the plurality of sets of tracks (connected track points), and the first output tracks are used by the Best Fit software to generate a second output of a plurality of dip data corresponding to the parameters of best fitting sine curves to the plurality of first output tracks.

Referring to FIG. 10b, as previously noted, the borehole image data 14, including data representing images of resistivity variations on a borehole wall, is used by the processor 10a during the execution of the Detection software 10c2. A typical "Detection software" 10c2 is disclosed in "'Picture Processing by Computer', Academic press, New York, 1969, page 94, by A. Rosenfeld" and " 'Digital Image Processing', John Wiley & Sons, New York, 1978, page 495, by W. K. Pratt", the disclosures of which are incorporated by reference into this specification. When the execution of the Detection software 10c2 is complete, a file 10c3 is created, that file 10c3 containing a set of image edge element data called "reports". The reports 10c3 are used by the processor 10a during execution of the Multi-Sine Tracking software 10c1 of the present invention. When the execution of the Multi-Sine Tracking software 10c1 is complete, a file 10c5 is created, that file 10c5 containing a plurality of tracks. The tracks 10cS are used by the processor 10a during execution of the Best Fit software 10c4. Each track 10c5 is defined to be a connected set of track points located on the borehole wall from 0 to 360 degrees around the borehole.

Figure 10C:
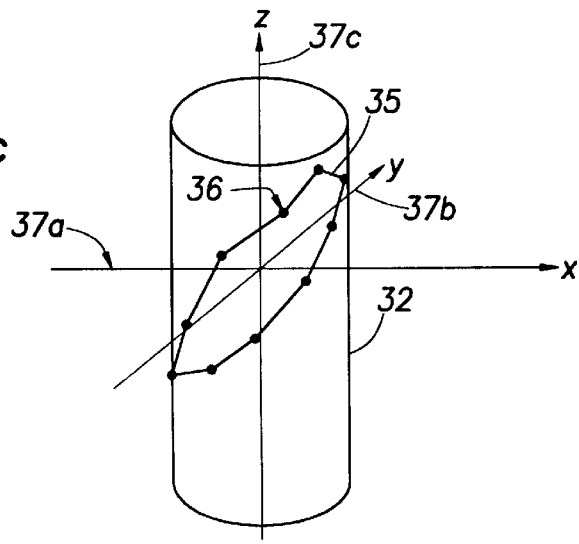
FIG. 10c illustrates a set of track points 36 which lie on a single track 35 that belongs to the set of tracks 10c5 of FIG. 10b.

FIG. 10c indicates the track points 36 lying on a single track 35 that belongs to the set of tracks 10c5 of FIG. 10b. In FIG. 10c, there are a set of orthogonal axes given by the x-axis 37a, the y-axis 37b and the z-axis 37c, which lies along the axis of the borehole 32. Each of the points 36 in the track 35 may be represented as a single triplet (x, y, z). For example, if there are M points 36 in a track 35, the i' point may be represented as ($x_i$, $y_i$, $z_i$), for i=1,2, . . . , M. Depending on the choice of "dip data" parameters as discussed earlier in the context of FIGS. 9a–9c, the Best Fit software 10c4 will identify the best fitting plane or sine curve to the M data points 36 in track 35 of FIG. 10c.

The following paragraphs will reveal how the Best Fit software 10c4 identifies the best fitting dip data 10c6, when the choice of parameters corresponds to either a plane or a sinusoid.

Assume that the dip data 10c6 parameterization chosen corresponds to a plane, that is, the triplet of parameters d are those specified in equation (9.7a): ($\gamma,\eta,\alpha$). As shown in equation (9.7), the plane is specified by the set of all (x,y,z) points such that:

$$\gamma+[\tan \eta \cos \alpha]x+[\tan \eta \sin \alpha]y=z \qquad (10.1)$$

For a given plane specified by the triplet of plane parameters ($\gamma,\eta,\alpha$), the vertical distance between the $i^{th}$ point on the track ($x_i$, $y_i$, $z_i$) and the plane specified by equation (10.1) is given by the term:

$$\gamma+[\tan \eta \cos \alpha]x_i+[\tan \eta \sin \alpha]y_i-z_i=\epsilon_i \; \epsilon_i=1, \ldots, M \qquad (10.2)$$

The Best Fit software 10c4 finds the values of the triplet of plane parameters ($\gamma,\eta,\alpha$) in equation (10.1) that minimizes a total measure of the errors shown in equation (10.2), for example:

$$(\gamma, \eta, \alpha)^* = \mathrm{argmin} \sum_{i=1}^{M} \varepsilon_i^2 \qquad (10.3)$$

The term "argmin" in equation (10.3) indicates that the "optimum" or "Best Fit" values for the tilted plane parameters ($\gamma,\eta,\alpha$), which are indicated using the star notation ($\gamma,\eta,\alpha$)*, correspond to the values of the tilted plane parameters ($\gamma,\eta,\alpha$) that minimize the sum of the squared errors $\epsilon_i^2$.

Alternatively, as discussed earlier regarding the choice of "dip data" parameters, the dip data may correspond to the parameters for a sinusoidal curve ($\gamma$, A, $\alpha$) shown in equation (9.9a). For a given value of the triplet of sinusoidal parameters ($\gamma$, A, $\alpha$), as shown in equation (9.9), the sinusoid is specified by the set of all (x,y,z) points such that:

$$\gamma + \left[\frac{A}{r}\cos\alpha\right]x + \left[\frac{A}{r}\sin\alpha\right]y - z = 0 \qquad (10.4)$$

where r is the borehole radius. The vertical distance between the $i^{th}$ point on the rack ($x_i$, $y_i$, $z_i$) and the sinusoid specified by equation (10.4) is given by the term:

$$\gamma + \left[\frac{A}{r}\cos\alpha\right]x_i + \left[\frac{A}{r}\sin\alpha\right]y_i - z_i = \varepsilon_i \qquad (10.5)$$

$$\varepsilon_i = 1, \ldots, M$$

The Best Fit software 10c4 finds the values of the triplet of sinusoid parameters ($\gamma$, A,$\alpha$) that minimize a total measure of the errors shown in equation (10.5), for example:

$$(\gamma, A, \alpha)^* = \operatorname{argmin} \sum_{i=1}^{M} \varepsilon_i^2 \qquad (10.6)$$

The term "argmin" in equation (10.6) indicates that the "optimum" or "Best Fit" values for the sinusoid parameters ($\gamma$, A, $\alpha$), which are indicated using the star notation ($\gamma$, A, $\alpha$)*, correspond to the values of the sinusoid parameters ($\gamma$, A, $\alpha$) that minimize the sum of the squared errors $\varepsilon_i^2$.

Various algorithms exist that may be used as the "Best Fit Software" 10c4 to solve the optimization problems in equations (10.3) and (10.6). A typical optimization algorithm defining a "Best Fit Software" 10c4 is disclosed in "'Linear Algebra and its Applications', Academic Press, New York, 1976, page 111, by G. Strang", the disclosure of which is incorporated by reference into this specification. When the execution of the Best Fit software 10c4 is complete, a file 10c6 is created, that file 10c6 containing a plurality of dip data "d", each set of dip data corresponding, respectively, to one of the plurality of tracks.

Figure 11:
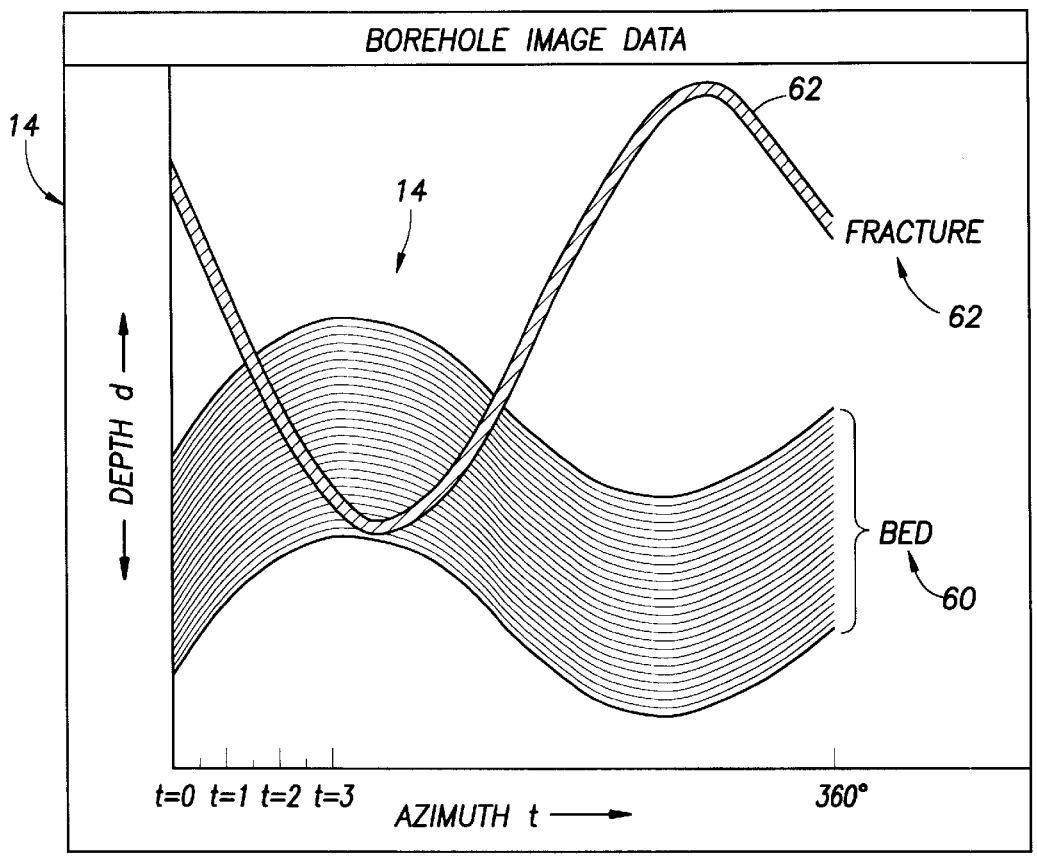
FIG. 11 illustrates the "borehole image data" that is provided as input data to the workstation of FIG. 10a representing images of resistivity variations on a borehole wall, these data normally being generated from a borehole imaging tool, such as a Formation MicroImager Tool.
Figure 12:
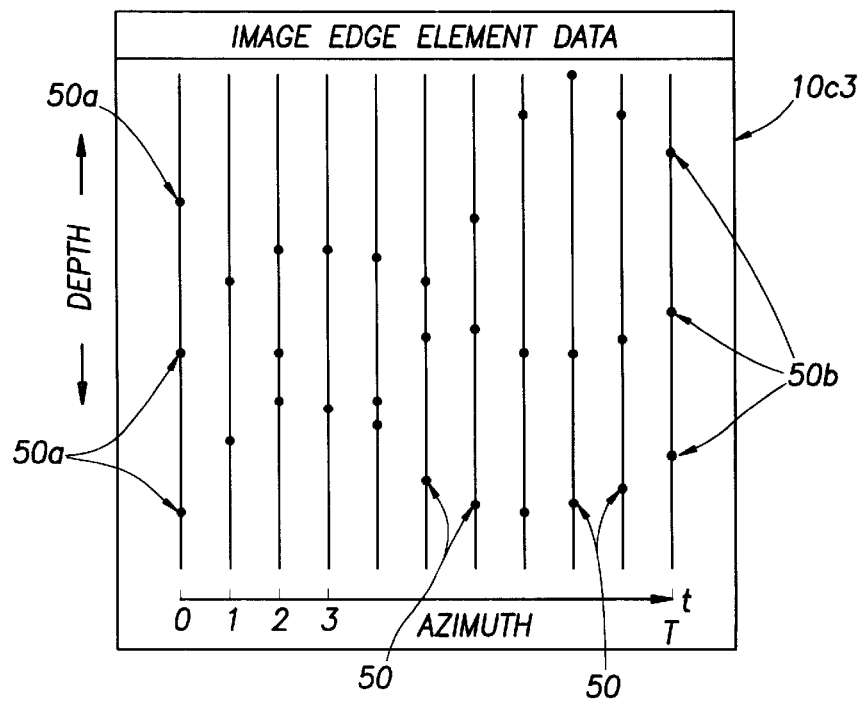
FIG. 12 illustrates the image edge element data "reports" being generated by the Detection software in response to the borehole image data, the "report" dots at each scan azimuth t=0 or t=1 or t=2 representing positions of detected events along the dip events on the internal wall of a borehole (the "report" corresponding to an element of the edge at the top or bottom boundary of a bed or an element on a fracture event)

Referring to FIGS. 8, 11 and 12, an example of a set of "borehole image data" 14 in FIG. 11 and a set of image edge elements or "reports" 10c3 in FIG. 12 is illustrated. As noted earlier, the borehole image data 14 in FIG. 11 is generated as an output from the FMI tool 16 shown in FIG. 8. The images visible on the borehole image data 14 of FIG. 11 include a plurality of "dip events", where the term "dip event" may include a plurality of fractures 62 in the earth formation 24 of FIG. 8 and/or a plurality of bed boundaries in the formation 24, or other approximately sinusoidally varying features appearing in the earth formation 24 of FIG. 8. However, the reports 10c3 in FIG. 12 are generated by the Detection software 10c2 of FIG. 10b from the borehole image data 14, the reports 10c3 including a plurality of reports (i.e., the dots) 50 appearing at different values of azimuth in degrees (t) around the borehole (e.g., azimuth degrees t=0, t=1, t=2, . . . , t=T). Each report (i.e., each dot) 50 in FIG. 12 represents, for example, an "edge" or "boundary" or an abrupt transition between a pair of beds or a "bidirectional" variation corresponding to a fracture, etc. For example, at azimuth t=0, three reports 50a are determined to exist vertically along the borehole wall 24 in FIG. 8; whereas, at azimuth t=T, three other reports 50b are determined to exist vertically along the borehole wall 24 in FIG. 8. The Multi-Sine Tracking software 10c1 of the present invention functions to connect the reports (i.e., the dots) 50 in FIG. 12 in order to reproduce the actual dip events (i.e., fractures 62 or bed 60 boundaries) which exist in the borehole image data 14. When the dots or reports 50 in FIG. 12 are connected together by the Multi-Sine Tracking software 1ocl of the present invention, the "first output" including the plurality of "tracks" 10c5 is generated.

Referring to FIGS. 13a and 13b, a detailed decomposition of the functionality within the Multi-Sine Tracking software 10c1 of FIGS. 10a and 10b is illustrated. The major steps of this functionality are the same as those found in Multi-Target Tracking, and therefore these FIGS. 13a and 13b and the descriptive text below are adapted from FIGS. 3.5 and 3.6 and the related text in the Kurien reference cited in this specification.

In FIGS. 13a and 13b, a block diagram of the steps taken by the Multi-Sine Tracking software 10c1 of the present invention, to connect together the reports (dots) 50 of FIG. 12 corresponding to dip events, for forming and generating the "plurality of tracks", is illustrated. Each of the steps in FIG. 13a will be listed below and discussed in detail later in this specification. The Multi-Sine Tracking software 10c1 includes a step of track modeling using a sine-cosine model 54 of FIG. 13c (in accordance with one aspect of the present invention) within the "Track Hypotheses Management" module 53, and the functionality of the "Track Hypotheses Management" module is further decomposed in FIG. 13b.

In FIG. 13a, the four main functional modules 52a, 53, 52b and 52c of the Multi-Sine Tracking software 10c1 are illustrated. These four modules process the sensor reports from each successive scan azimuth around the borehole. The input to the Multi-Sine Tracking software 10c1 is the set of sensor reports 10c3 as output by the Detection software 10c2, where the sensor reports are partitioned by scan azimuth. The output of the Multi-Sine Tracking software 10c1 is the plurality of confirmed target tracks 10c5, each track being a connected set of track points. The Multi-Sine Tracking software 10c1 consists of the following functionalities:

(1) The function of the Report Management module 52a is to partition the sensor reports within a scan into two groups: the first group consists of reports that can be associated with existing target tracks postulated prior to that scan; the second group consists of the remaining reports (which cannot be associated with existing target tracks). The first group are output from the Report Management module 52a as a plurality of Report-Track Pairs 52d, and the plurality of all available reports are output as well 52e.

(2) The function of the Track Hypotheses Management module 53 is to formulate and manage feasible target track hypotheses. This functionality is decomposed and discussed in more detail in FIG. 13b.

(3) The function of the Global Hypothesis Management module 52b is to form, at each successive scan azimuth, the global hypotheses (the assignment of reports to tracks treated collectively) from the track hypotheses (the association of reports to a single track). It uses one of various available methods, including, for example, the n-scan approximation technique described in the Kurien reference.

(4) The function of the Track Initialization module 52c is to initiate new target tracks using the unassociated sensor reports, that is, those reports 10c3 that have not already been assigned or associated with a track in the set of Report-Track Pairs 52d.

FIG. 13b shows a decomposition of the Track Hypotheses Management module 53, which consists of the following functionalities:

(1) The function of the Generate Track Hypotheses module 53a is to postulate feasible tracks for existing targets. This includes the postulation of multiple report associations (including missed report detections) for a predicted target track. Based on these associations, each postulated track is updated in the next step.

(2) The function of the Update Existing Tracks module 53b is to take as input the set of postulated tracks from the Generate Track Hypotheses module, and to update each track using a Kalman measurement update equation based on the "sine-cosine" dynamic target model 54 (FIG. 13c).

(3) The function of the Compute Likelihoods for Tracks module 53c is to review each report association with tracks, and based on the measurement residual (unpredictable component) from the previous Update Existing Tracks module 53b, to compute the likelihood for that report association.

(4) The function of the Prune Tracks module 53d and the Update Track Confidence Levels module 53e is to take as input the likelihoods for all tracks which are computed recursively in the previous Compute Likelihood for Tracks module 53c, and to use these likelihoods to classify targets into various confidence groups, then to prune or remove the least likely track hypotheses and to continue by using only the most likely tracks.

(5) The function of the Predict Tracks module 53f is to predict, at the next successive azimuthal position around the borehole, the new value for the state X, and to update the target state statistical covariance for each target on a likely track. The sine-cosine dynamic target model 54 (FIG. 13c) is used during this prediction step.

(6) This entire procedure is repeated from one scan azimuth to another around the borehole. The recursive procedure may continue more than a single revolution around the borehole, and is terminated once the plurality of estimated tracks is stable.

Referring to FIG. 13c, the Track Hypotheses Management module 53 in FIG. 13b has within it two functional blocks that have embedded within them the sine-cosine model 54 (in accordance with one aspect of the present invention). These two functional blocks are the Update Existing Tracks module 53b and the Predict Tracks module 53f. The sine-cosine model 54 is used within these two modules in order to advance the track models (state estimate and estimate covariance) to update each track with new report measurements and to predict the state at the next angular increment around the borehole, using the Kalman predictor and update equations.

Figure 14:
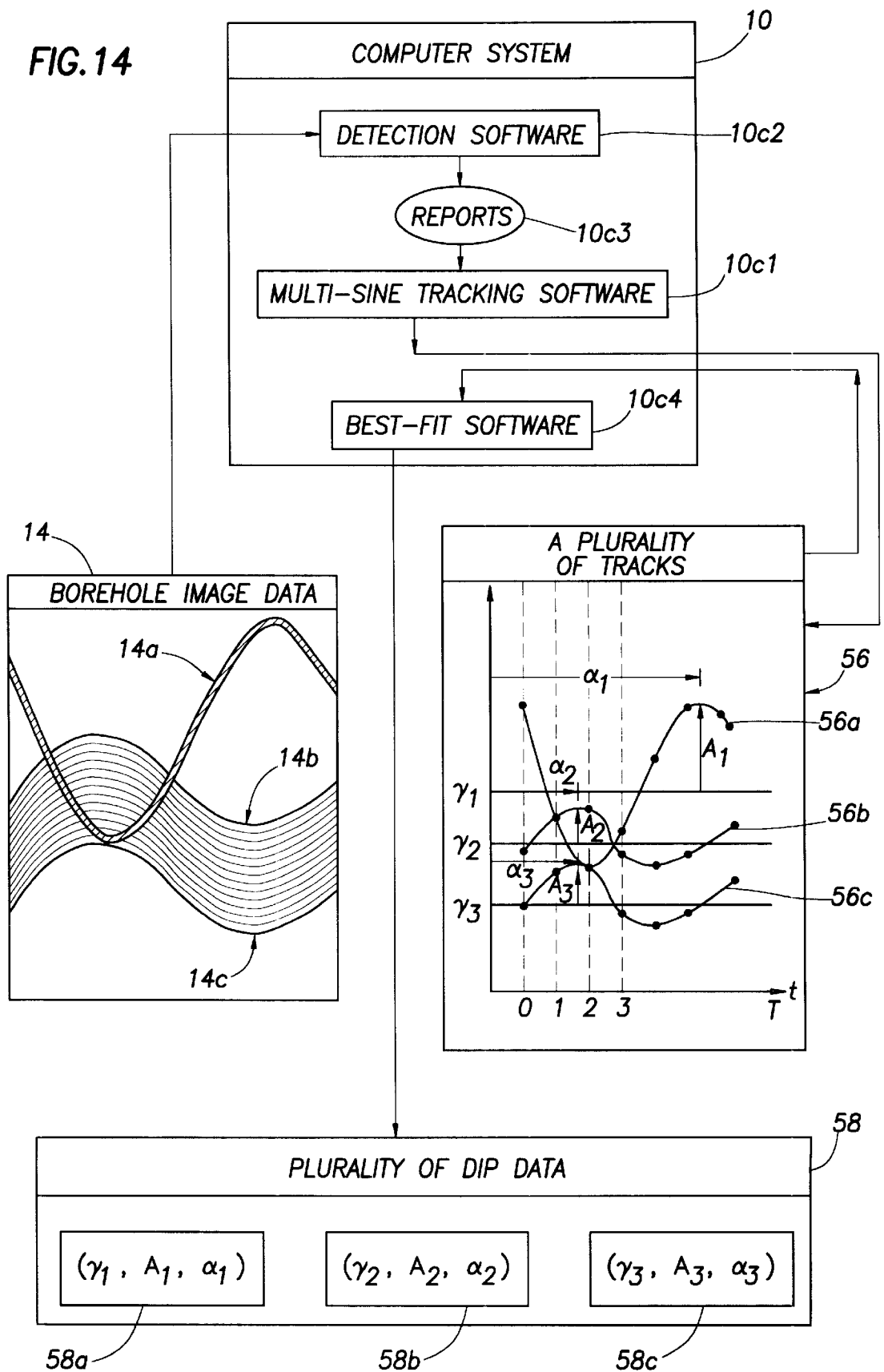
FIG. 14 illustrates the borehole image data of FIG. 11 (i.e., data representing images of resistivity variations on a borehole wall) being input to the computer system of FIG. 10a which stores the Detection software, the Multi-Sine Tracking software and the Best Fit software of the present invention, and "two outputs" being generated from the computer system of FIGS. 10a and 14 including: (1) a plurality of sets of connected track points corresponding, respectively, to a plurality of Earth formation dip events appearing on an internal wall of a borehole, and (2) a plurality of dip data which define, respectively, the plurality of sets of connected track points.

Referring to FIG. 14, in operation, the computer system 10 of FIG. 10a, including the Detection software 10c2, the Multi-Sine Tracking software 10c1, and the Best Fit software 10c4, receives the borehole image data 14 of FIG. 11. The Detection software 10c2 receives the borehole image data 14 and, when executed by the processor 10a, the Detection software 10c2 generates the "reports" 10c3 of FIG. 12 (i.e., the dots 50 of FIG. 12). The Multi-Sine Tracking software 10c1 receives the reports 10c3 and, when executed by the processor 10a, the Multi-Sine Tracking software 10c1 of the present invention generates a first output comprised of a plurality of tracks 56 including a first track 56a, a second track 56b, and a third track 56c. The Best Fit software 10c4 receives the plurality of tracks 56 and when executed by the processor 10a, the Best Fit software 10c4 generates a second output comprised of a plurality of sets of dip data 58 including a first set of dip data 58a corresponding to the first track 56a, a second set of dip data 58b corresponding to the second track 56b, and a third set of dip data 58c corresponding to the third track 56c. Note that, in our example of FIG. 14, the borehole image data 14 includes a first dip event 14a, a second dip event 14b, and a third dip event 14c. The first track 56a corresponds to the first dip event 14a, the second track 56b corresponds to the second dip event 14b, and the third track 56c corresponds to the third dip event 14c. In FIG. 14, the first set of track points 56a at depth $\gamma_1$ is best fit by a sinusoid with amplitude "$A_1$" and azimuth $\alpha_1$. Therefore, the dip data notation 58a for the first set of track points 56a is "$(\gamma_1, A_1, \alpha_1)$". The second set of track points 56b at depth $\gamma_2$ is best fit by a sinusoid with amplitude "$A_2$" and azimuth $\alpha_2$. The dip data notation 58b for the second set of track points 56b is "$(\gamma_2, A_2, \alpha_2)$". The third set of track points 56c at depth $\gamma_3$ is best fit by a sinusoid with amplitude "$A_3$" and azimuth $\alpha_3$. The dip data notation 58c for the third set of track points 56c is "$(\gamma_3, A_3, \alpha_3)$". In summary, the "nth" set of track points at depth $\gamma_n$ is best fit by a sinusoid with amplitude "$A_n$" at its azimuth $\alpha_n$, and the dip data notation for the nth set of track points is "$(\gamma_n, A_n, \alpha_n)$".

Referring to FIG. 15, the recorder or display 10b associated with the computer system 10 of FIG. 10a will generate the two above referenced outputs: (1) the "plurality of tracks" 56, and (2) the "plurality of dip data" 58 associated, respectively, with the plurality of tracks 56. These two outputs 56 and 58 in FIG. 15 define and reproduce the plurality of dip events, such as fractures or bed boundaries or other approximately sinusoidal features, which are inherent in the borehole image data 14 of FIG. 14 and which are disposed on the internal wall of borehole 24 of FIG. 8.

REFERENCES

All of the following references (1 through 21) are incorporated by reference into the specification of this application.

1. [Allaud] Allaud, L. and J. Ringot, "The High Resolution Dipmeter Tool", *The Log Analyst*, pp 3–11, May–June 1969.
2. [Anderson] Anderson, K. R. and J. E. Gaby, "Dynamic Waveform Matching", *Information Sciences*, Vol.31, 1983, pp.221–242.
3. [Bar-Shalom] Bar-Shalom, Y. and T. Fortmann, *Tracking and Data Association*, Academic Press, San Diego, Volume 169 in Mathematics in Science and Engineering, 353 pages, 1988.
4. [Baygun] Baygun, B., "Well-to-Well Correlation by Dynamic Programming: A User's Guide to the dynprog Software", SDR Research Note ISD-005-96-19, May 7, 1996.
5. [Bertsekas] Bertsekas, D. P., *Dynamic Programming and Stochastic Control*, Academic Press, New York, 1976, 397 pages.
6. [Cacas] Cacas, M. -C., "Method for Modeling a Stratified and Fractured Geologic Environment", U.S. Pat. No. 5,659,135, Assignee Institute Francais de Petrole, Aug. 19, 1997.
7. [Chemali] Chemali, R., S. Su, J. Goetz, R. Maute and F. Osborn, "Methods for Improved Dip Determination in Water-Based Mud with a Six-Arm Dipmeter", *The Log Analyst*, pp. 298–307, May–June 1991.
8. [Doveton] Dovetone, J. H., "Lateral Correlation and Interpolation of Logs", in *Geologic Log Analysis Using Computer Methods*, AAPG Computer Applications in Geology, 2, J. H. Doveton, 1994, pp. 127–150.
9. [Ekstrom] Ekstrom, M. P., C. A. Dahan, M- Y Chen, P. M. Lloyd, D. J. Rossi, "Formation Imaging with Microelectrical Scanning Arrays", *The Log Analyst*, Vol 28, No. 3, June 1987, pp. 294–306, and *Transactions of the SPWLA 27$^{th}$ Annual Logging Symposium*, Houston, Jun. 9–13, 1986, paper BB.
10. [Gelb] Gelb, A., "Applied Optimal Estimation", The MIT Press, Cambridge, Mass., 374 pages, 1974.
11. [Hall] J. Hall, M. Ponzi, M. Gonfalini and G. Maletti, "Automatic Extraction and Characterization of Geological Features and Textures from Borehole Images and Core Photographs", Proc. SPWLA 37$^{th}$ Annual Logging Symposium, Jun. 16–19, 1996, New Orleans, Paper CCC, 13 pages.
12. [Hepp] Hepp, V. and A. Dumestre, "CLUSTER—A Method for Selecting the Most Probable Dip Results from Dipmeter Surveys", Paper 5543, SPE 50$^{th}$ Annual Conf., Dallas, 1975.
13. [Kemp] Kemp, F., "An Algorithm for Automatic Dip Computation", *Computers and Geosciences*, Vol. 6, pp. 193–209, 1980.
14. [Kurien] Kurien, T., "Issues in the Design of Practical Multitarget Tracking Algorithms", Chapter 3 of *Multitarget-Multisensor Tracking: Advanced Applications*, Y. Bar-Shalom (editor), Artech House, Norwood, Mass., 1990.

15. [Lineman] Lineman, D. J., J. D. Mendelson and M. N. Toksoz, "Well to Well Log Correlation Using Knowledge-based Systems and Dynamic Depth Warping", SPWLA 28th Annual Logging Symposium, Jun. 29–Jul. 2, 1987.
16. [Moran] Moran, J., M. Confleau, G. Miller and J. Timmons, "Automatic Computation of Dipmeter Logs Digitally Recorded on Magnetic Tape", *Journal of Petroleum Technology*, vol. 14, no. 7, pp. 771–782, 1962.
17. [Schoonover] Schoonover, L. and O. Holt, "Computer Methods of Diplog Correlation", *SPE Journal*, pp 31–38, February 1973.
18. [Van Gysel] Van Gysel, N., "Correlation Automatique de Donnees de Puits par Programmation Dynamique", SRPC Borehole Geology Report, October 1997.
19. [Vincent] Vincent, Ph., J. Gartner and G. Attali, "An Approach to Detailed Dip Determination Using Correlation by Pattern Recognition", *JPT*, Vol. 31, No. 2, pp 232–240, 1979.
20. [Waterman] Waterman, M. S. and R. R. Raymond, "The Match Game: New Stratigraphic Correlation Algorithms", *Mathematical Geology*, Vol. 19, No. 2, 1987, pp. 109–127.
21. [Ye] Ye, S. -J., Ph. Rabiller and N. Keskes, "Automatic High Resolution Sedimentary Dip Detection on Borehole Imagery", *SPWLA 38$^{th}$ Annual Logging Symposium*, Paper O, Jun. 15–18, 1997.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus responsive to a set of borehole image data including a plurality of dip events representing images of resistivity variations on a borehole wall for generating a plurality of tracks representative, respectively, of said plurality of dip events and for generating a plurality of dip data corresponding to said plurality of tracks, comprising:

track generation means responsive to the borehole image data for generating said plurality of tracks representative of said plurality of dip events in said borehole image data, said track generation means using the following mathematical relation when generating said plurality of tracks in response to said borehole image data:

$d(T_{n+1}) = \cos(\delta_n) d(T_n) + \sin(\delta_n) v(T_n) + \text{noise}$ $v(T_{n+1}) = -\sin(\delta_n) d(T_n) + \cos(\delta_n) v(T_n) + \text{noise}$ where a new sinusoidal position "$d(T_{n+1})$" on an approximately sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise, and where $T_n$ denotes the $n^{th}$ value of angular azimuth around the borehole and $\delta_n = T_{n+1} - T_n$; and dip data generation means responsive to said plurality of tracks for generating said plurality of dip data corresponding, respectively, to said plurality of tracks and further representing said plurality of dip events in said borehole image data.

2. The apparatus of claim 1, wherein said track generation means comprises:

detection means responsive to said borehole image data for converting said borehole image data into a plurality of sets of image report data at a respective plurality of azimuths along said borehole wall, each set of image report data representing a location of said plurality of dip events at a particular azimuth along said borehole wall; and multi-sine tracking means responsive to said plurality of sets of image report data generated by said detection means for generating said plurality of tracks from said sets of image report data representative of said plurality of dip events in said borehole image data.

3. The apparatus of claim 2, wherein said multi-sine tracking means uses the following said mathematical relation when generating said plurality of tracks in response to said plurality of sets of image report data:

$d(T_{n+1}) = \cos(\delta_n) d(T_n) + \sin(\delta_n) v(T_n) + \text{noise}$ $v(T_{n+1}) = -\sin(\delta_n) d(T_n) + \cos(\delta_n) v(T_n) + \text{noise}$ where a new sinusoidal position "$d(T_{n+1})$" on an approximately sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise to represent unpredictable or unmodeled effects, and where $T_n$ denotes the $n^{th}$ value of angular azimuth around the borehole and $\delta_n = T_{n+1} - T_n$.

4. The apparatus of claim 2, wherein said multi-sine tracking means comprises:

a sine-cosine model apparatus adapted for implementing the following sine-cosine model mathematical relation:

$d(T_{n+1}) = \cos(\delta_n) d(T_n) + \sin(\delta_n) v(T_n) + \text{noise}$ $v(T_{n+1}) = -\sin(\delta_n) d(T_n) + \cos(\delta_n) v(T_n) + \text{noise}$ where a new sinusoidal position "$d(T_{n+1})$" on an approximately sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise to represent unpredictable or unmodeled effects, and where $T_n$ denotes the $n^{th}$ value of angular azimuth around the borehole and $\delta_n = T_{n+1} - T_n$; and an update existing tracks apparatus responsive to said sine-cosine model apparatus adapted for updating each postulated track using said sine-cosine model mathematical relation.

5. The apparatus of claim 4, wherein said multi-sine tracking means further comprises:

a predict tracks apparatus responsive to said sine-cosine model apparatus adapted for predicting tracks using said sine-cosine model mathematical relation.

6. A method of generating a plurality of dip data in response to a set of borehole image data, said borehole image data including a plurality of dip events and representing images of resistivity variations on a borehole wall, comprising the steps of:

(a) generating a plurality of tracks corresponding, respectively, to said plurality of dip events in response to said set of borehole image data by using the following mathematical relation:

$d(T_{n+1}) = \cos(\delta_n) d(T_n) + \sin(\delta_n) v(T_n) + \text{noise}$ $v(T_{n+1}) = -\sin(\delta_n) d(T_n) + \cos(\delta_n) v(T_n) + \text{noise}$ where a new sinusoidal position "$d(T_{n+1})$" on an approximately sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise, and where $T_n$ denotes the $n_{th}$ value of angular azimuth around the borehole and $\delta_n = T_{n+1} - T_n$; and (b) generating a plurality of dip data corresponding, respectively, to said plurality of tracks and representing said plurality of tracks.

7. The method of claim 6, wherein the generating step (a) for generating said plurality of tracks comprises the steps of:

(a1) converting said borehole image data into a plurality of sets of image report data at a respective plurality of azimuths along said borehole wall in response to said borehole image data, each set of image report data representing a location of said plurality of dip events at a particular azimuth along said borehole wall; and (a2) generating said plurality of tracks from said set of image report data representative of said plurality of dip events in said borehole image data in response to said plurality of sets of image report data.

8. The method of claim 7, wherein the generating step (a2) comprises the step of:

(a2-1) generating said plurality of tracks from said sets of image report data by using the following said mathematical relation:

$d(T_{n+1}) = \cos(\delta_n)d(T_n) + \sin(\delta_n)v(T_n) + \text{noise}$ $v(T_{n+1}) = -\sin(\delta_n)d(T_n) + \cos(\delta_n)v(T_n) + \text{noise}$ where a new sinusoidal position "$d(T_{n+1})$" on an sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise to represent unpredictable or unmodeled effects, and where $T_n$ denotes the $n^{th}$ value of angular azimuth around the borehole and $\delta_n = T_{n+1} - T_n$.

9. A program storage device adapted for storing a set of instructions of a program, said instructions adapted to be executed by a processor of a computer, said instructions when executed by the processor of the computer conducting a process comprising the steps of:

(a) generating a plurality of dip data in response to a set of borehole image data, said borehole image data including a plurality of dip events and representing images os resistivity variations on a borehole wall, the generating step (a) of generating a plurality of dip data comprising the steps of, (a1) generating a plurality of tracks corresponding, respectively, to said plurality of dip events in response to said set of borehole image data by using the following mathematical relation:

$d(T_{n+1}) = \cos(\delta_n)d(T_n) + \sin(\delta_n)v(T_n) + \text{noise}$ $v(T_{n+1}) = -\sin(\delta_n)d(T_n) + \cos(\delta_n)v(T_n) + \text{noise}$ where a new sinusoidal position "$d(T_{n+1})$" on an approximately sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise, and where $T_n$ denotes the $n^{th}$ value of angular azimuth around the borehole and $\delta_n = T_{n+1} - T_n$; and (a2) generating a plurality of dip data corresponding, respectively, to said plurality of tracks and representing said plurality of tracks.

10. The program storage device of claim 9, wherein the generating step (a1) for generating said plurality of tracks comprises the steps of:

(a1-1) converting said borehole image data into a plurality of sets of image report data at a respective plurality of azimuths along said borehole wall in response to said borehole image data, each set of image report data representing a location of said plurality of dip events at a particular azimuth along said borehole wall; and (a 1-2) generating said plurality of tracks from said sets of image report data representative of said plurality of dip events in said borehole image data in response to said plurality of sets of image report data.

11. The program storage device of claim 10, wherein the generating step (a1-2) of generating said plurality of tracks from said sets of image report data comprises the step of:

generating said plurality of tracks from said sets of image report data by using the following said mathematical relation:

$d(T_{n+1}) = \cos(\delta_n)d(T_n) + \sin(\delta_n)v(T_n) + \text{noise}$ $v(T_{n+1}) = -\sin(\delta_n)d(T_n) + \cos(\delta_n)v(T_n) + \text{noise}$ where a new sinusoidal position "$d(T_{n+1})$" on an approximately sinusoidally varying track and a new sinusoidal slope "$v(T_{n+1})$" on the sinusoidally varying track are each a function of a cosine and sine weighted sum of a previous sinusoidal position "$d(T_n)$" on the sinusoidally varying track and a previous slope "$v(T_n)$" on the sinusoidally varying track plus said noise to represent unpredictable or unmodeled effects, and where $T_n$ denotes the $n^{th}$ value of angular azimuth around the borehole and $\delta_n = T_{n+1} - T_n$.

* * * * *